(12) United States Patent
Nielsen

(10) Patent No.: US 11,536,826 B2
(45) Date of Patent: Dec. 27, 2022

(54) TRACKING DEVICE WITH DEFERRED ACTIVATION AND PROPAGATION OF PASSIVE TRACKS

(71) Applicant: Terma A/S, Lystrup (DK)

(72) Inventor: Esben Nielsen, Lystrup (DK)

(73) Assignee: TERMA A/S, Lystrup (DK)

( * ) Notice: Subject to any disclaimer, the term of this patent is extended or adjusted under 35 U.S.C. 154(b) by 289 days.

(21) Appl. No.: 17/014,879

(22) Filed: Sep. 8, 2020

(65) Prior Publication Data

US 2021/0055405 A1 Feb. 25, 2021

Related U.S. Application Data

(63) Continuation of application No. 15/125,121, filed as application No. PCT/EP2015/054929 on Mar. 10, 2015, now Pat. No. 10,802,131.

(30) Foreign Application Priority Data

Mar. 10, 2014 (DK) .............................. PA201470116

(51) Int. Cl.
*G01S 13/72* (2006.01)
*G01S 13/02* (2006.01)

(52) U.S. Cl.
CPC ..... *G01S 13/726* (2013.01); *G01S 2013/0272* (2013.01)

(58) Field of Classification Search
CPC .................. G01S 13/726; G01S 2013/0272
See application file for complete search history.

(56) References Cited

U.S. PATENT DOCUMENTS

| 5,117,360 A | * | 5/1992 | Hotz | G01S 7/295 342/195 |
| 5,414,643 A | * | 5/1995 | Blackman | G01S 13/726 342/95 |
| 5,537,119 A | * | 7/1996 | Poore, Jr. | G01S 13/726 342/96 |
| 7,026,979 B2 | * | 4/2006 | Khosla | G01S 13/726 342/195 |
| 7,030,809 B2 | * | 4/2006 | McCabe | G01S 13/723 342/195 |

(Continued)

FOREIGN PATENT DOCUMENTS

| WO | WO 00/10032 A1 | 2/2000 |
| WO | WO 2011/130722 A2 | 10/2011 |

OTHER PUBLICATIONS

Bar-Shalom et al., Dimensionless Score Function for Multiple Hypothesis Tracking, IEEE Transactions on Aerospace and Electronic Systems, vol. 43, No. 1, Jan. 2007.

(Continued)

*Primary Examiner* — Marcus E Windrich
(74) *Attorney, Agent, or Firm* — Knobbe, Martens, Olson & Bear LLP

(57) ABSTRACT

A tracking device is configured to estimate a track for at least one possible target and is configured to receive incoming measurements and to process measurements and tracks. The tracking device includes a storage and a computational device. The tracking device is also configured to divide all measurements into a set of considered measurements and a set of unconsidered measurements for each passive track.

20 Claims, 15 Drawing Sheets

(56) References Cited

U.S. PATENT DOCUMENTS

| | | | |
|---|---|---|---|
| 9,441,986 B2* | 9/2016 | Cronin | G01S 13/726 |
| 2008/0111730 A1* | 5/2008 | Ding | G01S 13/726 |
| | | | 342/90 |
| 2013/0234882 A1* | 9/2013 | Ploplys | G01S 13/726 |
| | | | 342/96 |
| 2015/0160338 A1* | 6/2015 | Bageshwar | G01S 13/933 |
| | | | 342/29 |

OTHER PUBLICATIONS

Chee-Yee Chong et al., Efficient Multiple Hypothesis Tracking by Track Segment Graph, 1ih International Conference on Information Fusion, Seattle, WA, USA, Jul. 6-9, 2009.

Chenouard et al., Multiple Hypothesis Tracking for Cluttered Biological Image Sequences, IEE Transactions on Pattern Analysis and Machine Intelligence, vol. 35, No. 11, Nov. 2013.

Final Office Action dated May 3, 2019 in U.S. Appl. No. 15/125,121.

Fortunato et al., Generalized Murty's Algorithm with Application to Multiple Hypothesis Tracking, DOI: 10.1109/ICIF.2007.4408017, Source: IEEEXplore, Conference Paper—Aug. 2007.

Frank et al., A Graphical Model Representation of the Track-Oriented Multiple Hypothesis Tracker, 2012 IEEE Statistical Signal Processing Workshop (SSP).

International Preliminary Report on Patentability dated Jun. 22, 2016 in International Application No. PCT/EP2015/054929; 11 pages.

International Search Report dated Jun. 3, 2015 in International Application No. PCT/EP2015/054929; 3 pages.

Notice of Allowance dated Jun. 9, 2020 in U.S. Appl. No. 15/125,121.

Office Action dated Nov. 27, 2019 in U.S. Appl. No. 15/125,121.

Office Action dated Oct. 4, 2018 in U.S. Appl. No. 15/125,121.

* cited by examiner

TRACKING DEVICE WITH DEFERRED ACTIVATION AND PROPAGATION OF PASSIVE TRACKS

PRIORITY AND CROSS REFERENCE TO RELATED APPLICATIONS

This application is a Continuation Application of U.S. application Ser. No. 15/125,121, filed Sep. 9, 2016, which is the U.S. National Stage Application under 35 U.S.C. § 371 of International Application No. PCT/EP2015/054929, filed Mar. 10, 2015, designating the U.S. and published in English as WO 2015/135924 A1 on Sep. 17, 2015, which claims the benefit of Denmark Patent Application No. DK PA201470116, filed Mar. 10, 2014. Any and all applications for which a foreign or a domestic priority is claimed is/are identified in the Application Data Sheet filed herewith and is/are hereby incorporated by reference in their entirety under 37 C.F.R. § 1.57.

FIELD OF INVENTION

This invention relates to a tracking device configured to estimate a track for at least one possible target and configured to receive incoming measurements and to process measurements and tracks. Specifically, the invention relates to a tracking device in which estimated tracks are maintained as active tracks or transferred to a set of passive tracks, deferring computations on the set of passive tracks until a handling criterion is fulfilled.

BACKGROUND OF THE INVENTION

Tracking of more than one target at the same time is an on-going field of development.

In practice a typical sensor is a radar sensor measuring range and direction to possible targets. A lot of measurements are false, unwanted comes from rain clouds, waves or other objects or simply due to noise and of no interest to the user.

In most practical applications, the user expects an upper limit to the latency through the system, being the time between a measurement is made by a sensor and a track is reported on the user interface.

A plurality of implementations of tracking and tracking devices do exist, but they are limited either due to complexity or non-convergence of calculations and thus results in high latency in the system using a tracker or a tracking device.

In CHEE-YEE et al., "Efficient multiple hypothesis tracking by track segment graph", Information Fusion, 2009. FUSION '09, 12$^{th}$ International Conference on pp. 2177-2184, 6-9 Jul. 2009, tracking using a track segment graph is discussed. In this reference, ambiguous track segments of multiple targets are maintained to generate a long term, or an extended duration, track hypothesis in case of ambiguity. Thus, the long term track hypothesis is provided only when needed, for example when the path of two targets almost overlap and make data association difficult. The long term track hypothesis is maintained to enable solving of the ambiguity when further feature data on the targets are provided, for example from infrequent video recordings of the targets. The long term track hypothesis is maintained to enable swapping of active tracks between targets when the ambiguity is resolved. This approach is working only when further feature data are available and is most useful when track swapping is the problem.

U.S. Pat. No. 5,414,643 discloses a tracking device in which two sets of tracks, a primary and a secondary, are maintained for each sensor. The primary tracks are the tracks which currently best represent the targets in a cluster. The tracks in the secondary set of tracks having less probability than the tracks in the primary set. However, both primary and secondary tracks are maintained actively increasing the required computational capacity.

Theoretical suggestions have been made on how to address tracking multiple targets.

For example IEEE 2005, Intn'l Conf on Systems, Man & Cybernetics, Hawaii, October 2005, Bar-Shalom et al discuss "The Dimensionless Score Function for Multiple Hypothesis Decision on Tracking", hereinafter referred to as Bar-Shalom 2005.

It is an objective to overcome limitations of the prior art.

SUMMARY

According to one aspect of the present invention a tracking device is provided, the tracking device being configured to estimate a track for at least one possible target and configured to receive or obtain incoming measurements and to process measurements and tracks. The tracking device is configured with a storage and a computational device having a computational capacity and configured with an association module configured to calculate an association between a measurement and a track. The tracking device further comprises an output module configured to output a sequence of track updates from an assignment module maintaining a set of active tracks and, using the association module to calculate associations between active tracks and the incoming measurements, the calculated associations containing possible track updates, deciding which track updates to keep in the set of active tracks and which track updates to add to a set of passive tracks; the computational capacity being configured to defer computations on the set of passive tracks until at least one passive track handling criterion is fulfilled. The computational device may furthermore be configured to activate at least one passive track from the set of passive tracks and transfer the at least one passive track from the set of passive tracks to the set of active tracks by at least one of the computations.

The passive track handling criterion may be a function of available computational capacity and/or a function of track probability or track likelihood.

The association module may be configured to calculate an association between a measurement and a track and, typically, a filter, such as a Kalman filter or any other filters, such as filters of the same or similar class or type, such as an interacting multiple model estimator, such as possibly more advanced filters of the same or similar class or type, may be used to calculate or estimate the likelihood of the association. Such filter types may be as described for example in Bar-Shalom 2005.

The association module may use one or more gating mechanisms so that associations with zero associability can be calculated with substantially less computational resources than otherwise. Typically, filtering may be performed after a track and measurement pair passes through the gate(s).

The output module may be configured to output tracks or at least track updates to the user or for further processing. If only track updates are sent out, the user can concatenate the track updates to a full track. The user may only receive a subset of the active tracks.

The assignment module may estimate the best set of tracks to be published via the output module using the associability as calculated by the association module to provide an assignment decision.

The assignment module may maintain a set of active tracks using the association module as a function of active tracks and the incoming measurements to calculate associations, containing possible track updates and deciding which track updates to keep in the set of active tracks and which track updates to add to a set of passive tracks.

The assignment module may thus, maintain a set of active tracks. The association module may calculate associations between active tracks and the incoming measurements and the calculated associations contain possible track updates. Based on the calculated associations, and thus the possible track updates, the assignment module may decide which track updates to keep in the set of active tracks and which track updates to add to a set of passive tracks; The assignment module may be, or may be implemented as an assignment module as known from the prior art. As such, a known or existing assignment module may be reconfigured or modified according to disclosures herein. An Implementation may be where provision is made to store otherwise discarded tracks and track updates as passive tracks.

One advantage is that the establishment of a set of passive tracks may enable implementation of or may allow the system to choose a simple and relatively fast assignment module for maintaining the set of active tracks such as, but not limited to, a Nearest Neighbour class or type of algorithm to yield a low latency output of the tracking device. At the same time it is able to use more complex implementations such as, but not limited to, multi-dimensional or multi-hypothesis type algorithm of tracking.

By the distinction between active tracks and passive tracks and by establishing and handling passive tracks, according to this disclosure, it is possible to bring back passive tracks into the set of active tracks, which active tracks are available to be maintained from the assignment module. This allows for a workable implementation that will implement multi hypothesis tracking types of algorithms without the need to calculate all possible tracks within a time window; or without a need to simultaneously maintain several hypotheses.

It is an advantage of the present invention that by reducing the amount of calculations, the number of active tracks may be reduced compared to conventional MHT methods. The gained computational resources or capacity may be used to allow a higher rate of incoming measurements if constrained to the same computational capacity.

Passive tracks, i.e. tracks added to the set of passive tracks by the assignment module, may be tracks which are not maintained, or not regularly maintained, and, thus, passive tracks may not be updated with incoming measurements, and the passive tracks are therefore, typically, not updated when new measurements or frames of measurements incoming at the tracker.

It is an advantage of adding tracks to a set of passive tracks which are not maintained, or not regularly maintained, in that the passive tracks may be kept for a much longer time, before discarding or pruning as computational capacity or power is not required to keep the passive tracks. Computations on the set of passive tracks may be deferred or postponed for more than 20 frames, such as up to 25 frames, such as up to 75 frames, such as up to 100 frames.

Typically, computations on the set of passive tracks are deferred until at least one track handling criterion is fulfilled. The at least one track handling criterion may be a function of available computational capacity. Thus, computations may be performed when there is unused or additional computational capacity. Furthermore, the at least one track handling criterion may be a function of track probability or track likelihood.

It is an advantage of the present invention that track fragmentation may be reduced, thus, typically, in track fragmentation one track may be lost, and a new track may be detected without realising that it is the same target which has moved differently than predicted. However, with the present invention, it may be possible to activate a passive track which follows the target from the time a false decision on the assignment was taken, without having to maintain or update all passive tracks in real time, that is maintain or update passive tracks as if they were active tracks. This may in turn increase the latency of the system, however, it has been found that an acceptable latency may be obtained by the present invention, and particularly by performing computations in dependence of available computational capacity, the latency can be kept at an acceptable level. In one or more embodiments, the tracking device may be configured to prioritize the computations on the set of passive tracks based on a function of track likelihood or track probability. Thus, if a passive track has a track likelihood or a track probability which is comparable with a track likelihood or a track probability of the active track, the computations on the set of passive tracks may be prioritized.

Even though computations have not been continued on a specific passive track, the track probability of the passive track may increase when the track probability or track likelihood of the competing active track is decreasing.

The activation of a passive track, and likewise the passivation of an active track may be performed by an activation module configured to activate a passive track, respectively passivate an active track.

Besides reduction in algorithmic complexity from at least $O(M^N)$, M being the number of measurements per frame and N being the number of frames in the time window, the disclosed tracking device may have a complexity as low as to $O(N\, M \log M)$ and therefore becomes more efficient since it requires less computational resources and thus also saves computational resources, which are limited or expensive.

A person skilled in the art of working with tracking devices and/or radar systems will recognise that the field and literature of the field may use different terms for the same features.

A person skilled in the art will appreciate that a measurement may be data records possibly obtained from a sensor. A measurement may contain information about the position of and possibly some other features, such as radar intensity, corresponding to a possible target. A measurement may originate from a true target, but many measurements may also be false measurements, for instance originating from noise.

A measurement may also be an observation or basically a record of data provided.

A measurement may also just be a data item containing information about the sensor, thus not what is actually sensed. For instance: If the sensor is a rotating radar, it may send dummy measurements of the current antenna position. These dummy measurements have zero associability with any track.

For measurements or equivalents, a track is here defined as a sequence of measurements, $\tau=\{m_1, m_2 \ldots \}$, which, when connected, might be a true series of measurements originating from the same target; and a possible target being a possible real world object being tracked.

For a track there may be a track update, which may be a track appended or linked with a measurement creating a new track, $\tau'=\tau\cup\{m\}=\{m_1, m_2 \ldots, m\}$.

A measurement may fit a track. How well the fit is, is described or termed as assocability. Thus associability may be implemented by a scoring function for how well a measurement fits with a track. The scoring function, and thus the associability, may be a number informing the system how likely it is, or a measure of how likely it is, given the possible track is a correct set of measurements for a target, that the extension of the track with a measurement is a correct set of measurements for the target.

A filter may be used, where the so called continuation likelihood ratio is used for associability, such as a for example a Kalman filter or any other similar filter. In the present disclosure, any likelihood for association between a track $\tau$ and a measurement m may be denoted $L(\tau,m)$.

The function of an association module or "associator" is to calculate, estimate or otherwise provide an association for a given possible track and a measurement, where association is the associability between a track and a measurement, and, if the associability is high enough, also the resulting track update. The associability may be a measure of correlation between the track and the measurement.

The tracking device is furthermore configured to perform an assignment. The assignment may be a process of choosing which track updates to work on, and which to discard, after new measurements have been included.

A two-dimensional or 2-D assignment may start with what is considered to be the best hypothesis of M possible tracks, and after a set of N measurements have been received and M×N associabilities have been calculated, then the 2-D assignment yields a new set of tracks containing between M and M+N tracks, which is now considered to be the best hypothesis.

An assignment module is a module performing assignment. The assignment or assignment module may be Implementations of a 2-D assignment, but may also be a K-best hypotheses assignment. Multi-Dimensional Assignment (MDA), or even K-best MDA.

The tracking device may be configured to handle or process active tracks. The set of active tracks is the set of tracks that the assignment module updates, maintains or handles. When a 2-D assignment algorithm is implemented, this is an approximation to the best hypothesis. A person skilled in the art will appreciate other implementations. In a K-best assignment this may be the union of the K-best hypotheses, in an MDA implementation it may the whole of the track tree on which the MDA is calculating. In a K-best MDA implementation it may the union of the K track trees that the K-best MDA uses.

A feature of operating on passive tracks and active tracks is to activate tracks. This is the task of promoting a track from the set of passive tracks or passive container to the set of active tracks.

Different algorithms can be applied. Using the known MDA algorithms, such as Lagrangian relaxation, to estimate the best global hypothesis for all tracks, passive and active, is one possible way to populate the best hypothesis used for 2-D assignment MDA algorithms exist to find the K-best hypotheses when the assignment method is based on a K-best method. A person skilled in the art may implement various tasks of the tracking device in a modular way, or alternatively implement the tracking device as a monolith or as a single unit. Likewise, a person skilled in the art will readily acknowledge the need to be able to provide storage, means for moving data records around and make provisions for deleting useless data to avoid running out of storage.

The computational device may be a processing unit or another device having a computational capacity, i.e. a computer processing capacity, and may comprise a CPU or any other processor having a given final processing power or computational capacity. Each module as herein discussed may be implemented in the computational device, each module being dedicated to performing tasks as allocated to this module. The modules may be implemented either as separate modules or as one module performing a plurality of tasks.

In one or more embodiments, the tracking device is further configured to divide all measurements into a set of considered measurements and a set of unconsidered measurements for each passive track. The tracking device may be configured with a propagator module configured to propagate a selected passive track using the association module to calculate an association as a function of an unconsidered measurement and the selected passive track; adding the possible track update of the selected passive track and the unconsidered measurement to the set of passive tracks, and marking the measurement considered for both the selected passive track and the possible track update.

The division of all measurements may be performed since the passive tracks are not associated with incoming measurements received or obtained after a passive track has been added to the set of passive tracks. With no knowledge of which measurements that might be associated with a passive track, it may be difficult to build the correct track tree and a track might skip one or more measurements. For an active track, on the other hand, all measurements have been considered, depending on the mode of operation in the assignment module.

If the association module uses gating to optimize its calculations and a track and a measurement is found to be outside the gating, the pair may still be defined as considered, however, the pair maybe disregarded by gating.

One pre-requisite for a passive track to be activated may be that all measurements must have been considered. An implementation using a 2-D assignment works better if this is enforced but it is not a requirement for a working implementation.

The propagator module may allow for calculation of parts of a track tree independently of the assignment module. The full track tree, which is calculated as suggested in the prior art track oriented multi hypothesis tracking (TOMHT), might still be calculated if computational capacity is available, but the propagator module might only calculate the parts which have the most interest. Therefore implementations according to disclosures herein may save considerable computational capacity.

Furthermore, track propagation may be deferred to other computational units. An implementation may utilize multiple CPUs or other multiple processor configurations.

In one or more embodiments, a division of considered measurements and unconsidered measurements is performed by using an ordered identifier of incoming measurements and storing the ordered identifier of the latest considered measurement on each passive track; and the track propagator is configured to propagate a selected passive track according to the ordered identifier, advancing the ordered identifier of the latest considered measurement of the selected passive track.

The measurements may be stored in a linear container or a list. The incoming measurements may be appended to the container. The ordered identifier may be an index or a timestamp indexing into this container.

By storing the ordered identifier of the latest considered measurement on each passive track, it becomes a straightforward implementation to find the measurements with an identifier larger than the stored identifier and then propagate the track by calculating associations to the next measurements in the measurement container or list.

In one or more embodiments, passive tracks may be propagated as a function of available computational capability. In some embodiments, passive tracks may be activated as a function of available computational capacity. The tracking device may be configured to propagate the passive tracks.

By lowering the prioritization of the propagation module and the track activation, the tracking device will primarily use computational capacity for associating incoming measurements and tracks and assigning tracks to the set of active tracks and the set of passive tracks, respectively. Thus, the computational capacity may primarily be used on the association module and the assignment module. The prioritization of the propagation module may for example be lowered when the rate of incoming measurements becomes high. In practice, this may be during a bad weather situation, where a radar sensor might output many extra measurements. Thus, the degree of multi hypothesis tracking can smoothly be scaled up or down depending on availability of the computational capacity according to actual circumstances.

Furthermore, the tracking device may be configured to passivate an active track and transfer the active track from the set of active tracks to the set of passive tracks. If the computational capacity is temporarily too low for even the assignment module to operate correctly, passivating active tracks to the set of passive tracks may be a way to overcome the starvation without deleting data.

Provisions of storage may be provided as needed and tracking device may be configured with a measurement module configured with a measurement container configured to store and process measurements within the tracking device.

Likewise, the tracking device may be configured with a pruning module configured to discard or delete unwanted or unimportant tracks.

To avoid that a set of passive track grows beyond capacity or the storage is exceeded, provisions for a removing or pruning module is needed. One option is to delete all passive tracks that have an estimate of probability that is under a threshold. Another option is to use a sliding window; which is known from prior art TOMHT implementations. I.e. this is to eliminate branches in the track tree spanning more than a fixed time interval before the latest received or obtained measurement, while only maintaining the branch in the tree having the highest estimate of probability, or maintaining the part of the track tree containing an active track.

In this disclosed implementation, the time interval may be large compared to other TOMHT implementations, because the track tree is much more sparse.

In one or more embodiments, the tracking device may be configured to prioritize propagation of passive tracks based on a function of track likelihood, $L(\tau)$. Thus, the propagation of passive tracks may be based on a function of track likelihood, $L(\tau)$.

A cumulative log-likelihood or negative track score $l(\tau)$ as defined in Bar-Shalom 2005 may be used, or for example an equivalent track likelihood, $L(\tau) \propto \exp(-l(\tau))$, or simply $L(\tau) = \exp(-l(\tau))$, may be used.

When no measurement is assigned to a track, but one was expected with probability $P_D$ (probability of detection), $L(\tau)$ may be multiplied with $1-P_D$. In the case of a rotating radar, this happens when the antenna has scanned or passed the direction where the track is expected to be for a given scan.

Applying notations used herein, the likelihood can be calculated recursively as $$L(\tau \cup \{m\}) = L(\tau) L(\tau, m),$$

with $L(\tau, m)$ being the likelihood of association, or continuation likelihood.

In one or more embodiments, the estimate of track probability $P(\tau)$ may be calculated as:

$$P(\tau) \simeq P_0(\tau) \equiv \frac{L(\tau)}{L_0 + \sum_{\tau' \in t} L(\tau')}$$

where t is the target for which $\tau$ is a possible track.

$L_0$ is the likelihood of the target not being a real target. If the target is known to be real $L_0 = 0$.

In many cases $L_0 = 1$, but $L_0$ and $L(\tau)$ can freely be multiplied by a constant so as to fit numerically within a machine representable range.

When the tracking device is configured to initiate tracks automatically, a possible new target with one track may be created for each measurement. This so-called singleton track consisting of a single measurement $\tau = \{m\}$ typically has a very low likelihood, i.e. $L(\{m\}) \ll L_0$, such that $P_0(\tau) \ll 1$. $L(\{m\})$ is essentially the ratio of density of new targets to density false measurements, when $L_0 = 1$.

The track probability estimate may be a basis estimate for one target having several possible tracks. The estimate may not address more than one target conflicting and competing for the same measurement. Also, when the tracker is configured to make new tracks from measurements, the probability of a new track being parallel with an existing track may be overestimated.

In one or more embodiments, the estimate of track probability, P(t) is calculated by an approximation $$P(\tau) \approx P_{eff}(\tau) \equiv \frac{L(\tau) X(\tau)}{L_0 + \sum_{\tau' \in t} L(\tau') X(\tau')}$$

where $$X(\tau) \equiv \min_{\text{other targets}, t} X_t(\tau)$$

where $$X_t(\tau) \equiv 1 - \sum_{\tau' \in t, \tau \cap \tau' \neq \emptyset} P_0(\tau')$$

where $$P_0(\tau) \equiv \frac{L(\tau)}{L_0 + \sum_{\tau' \in t} L(\tau')}$$

where t is the target (6) for which $\tau$ is a possible track (4).

The advantage of this estimate is that, when a track of a small target following a large target will have a small exclusion factor X, because the measurements are already occupied by the track of the large target. Therefore, the probability estimated of the correct track of the small target veering away from the large target may be much higher using this estimate.

In one or more embodiments, a passive track is activated into the set of active tracks when the track likelihood, $L(\tau)$, or track probability, $P(\tau)$ is over a predefined threshold.

The association module may calculate the track likelihood for each track update.

It is a possibility to use the likelihood as a basis for prioritization propagation. A downside may occur since long living tracks may have a very large likelihood. Therefore, in some embodiments, only propagations of passive tracks belonging to long living targets may be conducted.

In one or more alternative or additional embodiments, the tracking device may be configured to prioritize propagation of passive tracks based on a function of an estimate of track probability, $P(\tau)$.

Using an estimate of track probability for each passive track as a basis for prioritizing track propagating may be advantageous, since the use of computational capacity is optimized. This may be as computational capacity is used only on the most likely parts of the track tree. This part of the track tree may in turn change as new measurements arrive or track propagations are calculated.

In one or more embodiments of the tracking device, the assignment module may be based on one or more of the following assignment algorithms:
  A. a Nearest Neighbor algorithm;
  B. a 2-dimensional assignment algorithm;
  C. an N-dimensional assignment algorithm;
  D. a K-best multi hypothesis assignment; or
  E. a K-best N-dimensional assignment.

One of the algorithms may be used at the time, but more algorithms may be implemented for use at the same time. These assignment methods or algorithms have shown to be working options and may be used for assignments. The algorithms may be implemented in the assignment module. Other assignment methods or combinations of the lists may be implemented.

In one or more embodiments, the tracking device may be implemented using a Nearest Neighbour or a 2-D assignment algorithm and activating tracks may be performed by estimating the best hypothesis considering the set of active tracks and a subset of the set of passive tracks, and activating tracks belonging to the hypothesis and passivating tracks not belonging to the best hypothesis.

Such a method could be a Multi Dimension Assignment algorithm such as Lagrangian relaxation, see for example Bar-Shalom 2005. This will, however, require that measurements can be arranged in some kind of frames.

In one or more embodiments, the best hypothesis among a set of tracks is estimated by repeatedly selecting the track with the highest estimate of track probability, $P(\tau)$ and disregarding all conflicting tracks.

This method may not be as precise estimating the best hypothesis as Lagrangian relaxation, but is advantageous since it does not require the measurements to be arranged in frames.

Furthermore, the algorithm scales as O(T log T), where T is the number of tracks considered. Furthermore, as tracks not estimated to belong to the best hypotheses are not deleted, but kept in the set of passive tracks, any error may be corrected as further track propagations are calculated and/or further measurements are received or obtained, as is illustrated in the detailed description.

In one or more embodiments using N-dimensional assignment, the activating may be performed by building a set of tracks consisting of a subset of the active tracks and a subset of the set of passive tracks and iterating until the set is empty. Iteration may be performed as: move the track with the highest estimate of track probability to the set of active tracks; and move all tracks conflicting in any frame up to and including the N−1'th newest frame with any track in the selected hypothesis to the set of passive track.

In one or more embodiments, the activating is performed by considering one of the K hypotheses used in the assignment module and building a set of tracks consisting of a subset of the active tracks in the selected hypothesis and a subset of the set of passive tracks and iterating until the set is empty: moving the track with the highest estimate of track probability to the set of active tracks in the selected hypothesis; and moving all tracks conflicting with any track in the selected hypothesis to the set of passive tracks.

In one or more embodiments, the activating may be performed by considering one of the K hypotheses used in the assignment module and building a set of tracks consisting of a subset of the active tracks in the selected hypothesis and a subset of the set of passive tracks and iterating until the set is empty: moving the track with the highest estimate of track probability to the set of active tracks in the selected hypothesis; and moving all tracks conflicting in any frame up to and including the N−1$^{th}$ newest and older frame with any track in the selected hypothesis to the set of passive tracks.

It is understood that more tracks may be conflicting tracks, if they are deemed to originate from the same target, or if they share a common measurement, i.e. $\tau_1 \cap \tau_2 \neq \emptyset$. Two tracks are conflicting in any frame up to and including the N−1$^{th}$ newest frame if they are deemed to originate from the same target, or, if they share a measurement in any frame up to and including the N−1$^{th}$ newest frame.

It is furthermore understood that a hypothesis is a set of non-conflicting tracks and that a best hypothesis may be the hypothesis having the best combined likelihood.

According to a further aspect of the present invention, a method of tracking is provided, the method comprising processing a measurement and a track, which method of tracking encompasses:
  receiving or obtaining a measurement;
  associating the measurement with a track by calculating an association between the measurement and the track;
  assigning tracks by maintaining a set of active tracks by associating and extracting possible track updates and deciding which track updates to keep in the set of active tracks and which track updates to add to a set of passive tracks, and defer computations on the set of passive tracks until at least one passive track handling criterion is fulfilled. The at least one of the computations on the set of passive tracks may furthermore activate a passive track from the set of passive tracks and transfer the passive track from the set of passive tracks to the set of active tracks;
  outputting a track update.

Thus, an objective is achieved by a method performing acts as disclosed by modules or systems herein. Again, a person skilled in the art is not bound to strictly apply steps in a sequential order, and will realise that actions may be implemented in parallel and sub-steps may be performed as routine calls.

In one or more embodiments, the method of tracking further encompasses:
  dividing all measurements into a set of considered measurements and a set of unconsidered measurements for each passive track; and
  propagating, by computations on the set of passive tracks, a selected passive track by associating by calculating an association as a function of an unconsidered measurement and the selected passive track and adding the possible track update of the selected passive track and the unconsidered measurement to the set of passive tracks, marking the measurement considered for both the selected passive track and the possible track update.

In some embodiments, the method of tracking further encompasses pruning or elimination of tracks.

In some embodiments, the method of tracking propagating of passive tracks is based on a function of track likelihood, $L(\tau)$, or on a function of an estimate of track probability, $P(\tau)$ In some embodiments, the method of tracking assigning is based on one or more of the following assignment implementations:

A. a Nearest Neighbor algorithm;
B. a 2-dimensional assignment algorithm;
C. an N-dimensional assignment algorithm;
D. a K-best multi hypothesis assignment; or
E. a K-best N-dimensional assignment.

In an embodiment the method of tracking propagating may be based on an estimate of track probability, $P(\tau)$, as discussed above.

An important feature in this implementation is that track likelihood may be compared and used among tracks not having the same set of considered measurements.

In a further aspect of the present invention, a method of tracking is provided, the method of tracking comprising receiving or obtaining at least one measurement from a sensor and processing the at least one measurement and at least one track, which method of tracking encompasses receiving or obtaining the at least one measurement and associating the at least one measurement with the at least one track by calculating an association between the at least one measurement and the at least one track, and/or create a new track for example by track initialisation. Furthermore, the method may encompass calculating and using track likelihoods for assigning measurements to tracks while dividing all measurements into a set of considered measurements and a set of unconsidered measurements for each track, which unconsidered measurements are deferred for later associating or assigning. The method also encompasses outputting a track update.

In the Bayesian probability theory, it is a basic assumption that all tracks must consider all received or obtained measurements for the formulas used in the described methods to be valid. It is an advantage of the present invention, that this may not be needed. The track tree may be partially updated, and updates may be deferred until later, but still using the track likelihood or track score as though the whole track tree has been updated. For each track, one may use knowledge or information of which measurements have been considered and which measurements are unconsidered to defer the update until later.

According to a still further aspect of the present invention, a tracking system comprising a sensor module and a tracking device is provided. Thus, the tracking device as herein described may be embedded in a tracking system. The tracking system may be a radar system, or any other sensor system, comprising a sensor module and configured to provide measurements to the tracking device. The sensor module may comprise at least one or more sensors and a sensor control unit.

It is envisaged that all embodiments as described in connection with specific aspects of the present invention, may be equally embodied with each aspect.

BRIEF DESCRIPTION OF DRAWINGS

The embodiments will now be described more fully hereinafter with reference to the accompanying drawings, in which exemplary embodiments are shown. The claimed Invention may, however, be embodied in different forms and should not be construed as limited to the embodiments set forth herein. Embodiments of the invention will be described in the figures, wherein:

DETAILED DESCRIPTION OF THE DRAWINGS

| Item | No |
|---|---|
| Tracking device | 1 |
| Measurement | 2 |
| Track | 4 |
| Track update | 5 |
| Target | 6 |
| Sensor | 8 |
| Process | 10 |
| Computational device | 12 |
| Computational capacity | 14 |
| Receiving module | 20 |
| Receiving time | 22 |
| Storage | 23 |
| Track likelihood | 25 |
| Estimate of track probability | 26 |
| Conflicting tracks | 27 |
| Non-conflicting tracks | 28 |
| Association module | 30 |
| Associability | 31 |
| Association | 32 |
| Assignment module | 40 |
| Maintaining | 41 |
| Keep | 42 |
| Add | 43 |
| Output Module | 50 |
| Measurement container | 70 |
| Pruning Module | 80 |
| Hypothesis | 90 |
| Set of active tracks | 100 |
| Active track | 102 |
| Set of passive tracks | 110 |
| Division of measurements | 111 |
| Passive track | 112 |
| Considered measurement | 113 |
| Unconsidered measurement | 114 |
| Ordered identifier | 115 |
| Latest considered measurement | 116 |
| Selected passive track | 117 |
| Advance | 118 |
| Activate | 120 |
| Passivate | 130 |
| Propagator Module | 150 |
| Propagate | 152 |
| Receiving | 200 |
| Method of tracking | 222 |
| Associating | 300 |
| Assigning | 400 |
| Outputting | 500 |
| Propagating | 600 |

-continued

| Item | No |
| --- | --- |
| Dividing | 610 |
| Pruning | 700 |

Figure 1:
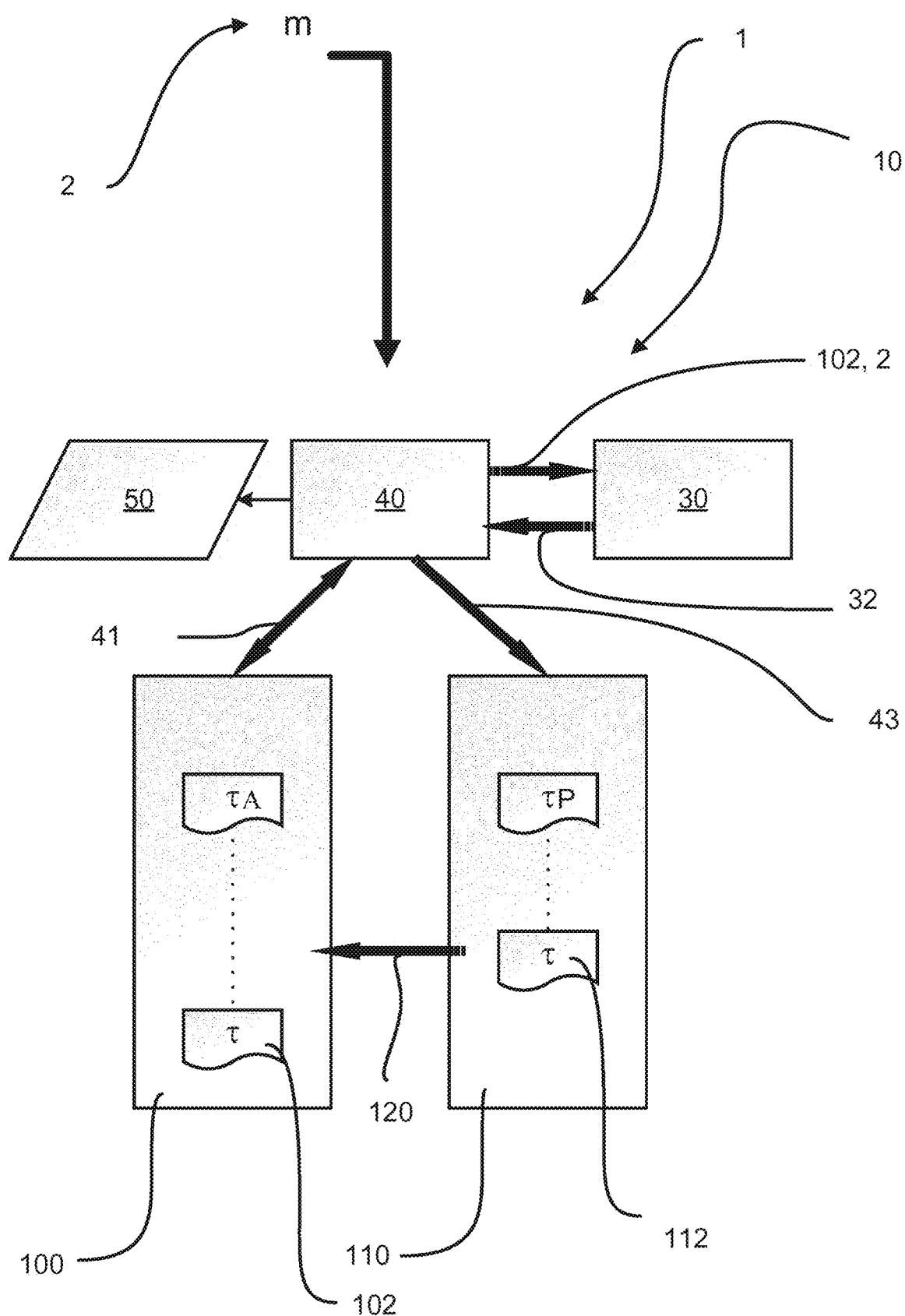
FIG. 1 illustrates an embodiment of a tracking device with a set of active tracks and a set of passive tracks.

FIG. 1 illustrates a tracking device 1 configured to estimate a track 4 for at least one possible target 6 and configured to receive or obtain incoming measurements 2 and to process 10 measurements 2 and tracks 4. The tracking device 1 provides a track update 5 (not shown).

The measurement 2 may be an observation and may be obtained from a sensor 8 (not shown).

The tracking device 1 is configured with a storage 23 (not shown) and a computational device 12 (not shown) having a computational capacity 14 (not shown). The computational device 12 may be a computer with one or more processing units in in the form of central processing unit(s) (CPU), graphics processing unit(s) (GPU) or a field-programmable gate array(s) (FPGA). It is understood that the computational device has a limited computational capacity 14.

The tracking device 1 may have an output module 50 configured to output a sequence of track updates 5.

The tracking device 1 may have an association module 30 configured to calculate an association 32 between a measurement 2 and a track 4.

In the illustrated embodiment the output module 50 receives the track update 4 from an assignment module 40. The assignment module 40 interacts with the association module 30. The assignment module 40 provides a measurement 2 and an active track 102, possibly paired. The association module 30 provides an association 32.

In this embodiment the assignment module 40 is configured to maintaining 41 a set of active tracks 100 using the association module 30 as a function of active tracks 102 and the incoming measurements 2 to calculate or estimate associations 32, containing possible track updates 5 and deciding which track updates 5 to keep 42 (not shown) or maintain in the set of active tracks 100 and which track updates 5 to add 43 to or to place in a set of passive tracks 110.

In this embodiment, the tracking device 1 is further configured to activate 120 a passive track 112 from the set of passive tracks 110 and transfer the passive track 112 from the set of passive tracks 110 to the set of active tracks 100.

Figure 2:
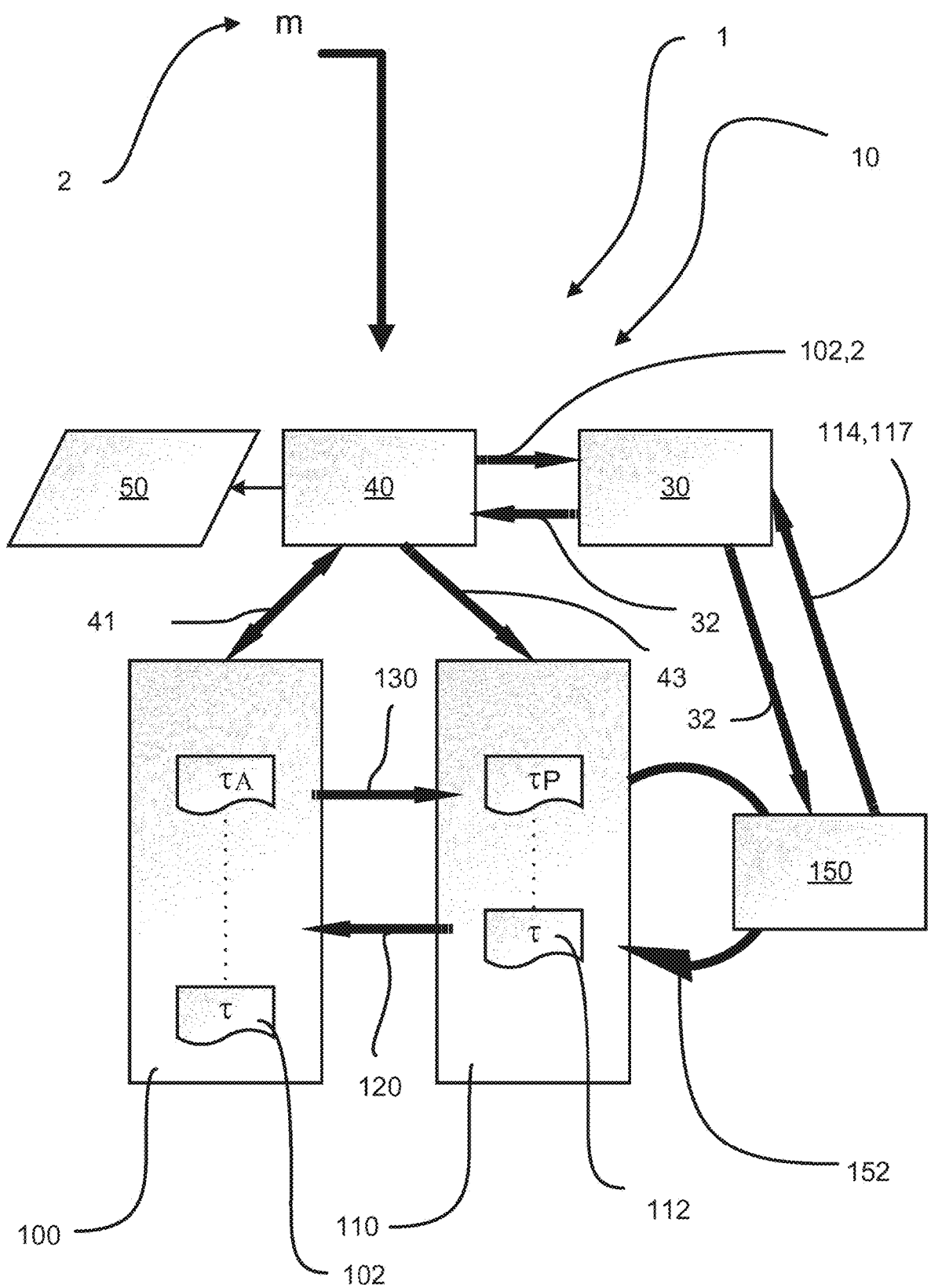
FIG. 2 illustrates an embodiment of a tracking device with a propagator module.

FIG. 2 illustrates in continuation of FIG. 1 an embodiment where a tracking device 1 configured with a propagator module 150 configured to propagate 152 a selected passive track 117 using the association module 30. As will be illustrated in FIG. 3 the tracking device 1 is further configured to divide 111 (not shown) all measurements 2 into a set of considered measurements 113 (not shown) and a set of unconsidered measurements 114 for each passive track 112.

The propagator module 150 is in this embodiment configured to propagate 152 the selected passive track 117 using the association module 30 to calculate an association 32 as a function of an unconsidered measurement 114 and the selected passive track 117. The propagator module 150 then adds the possible track update 5 of the selected passive track 117 and the unconsidered measurement 114 to the set of passive tracks 110. The propagator module 150 then marks the measurement considered 113 for both the selected passive track 117 and possible track update 5.

Figure 3:
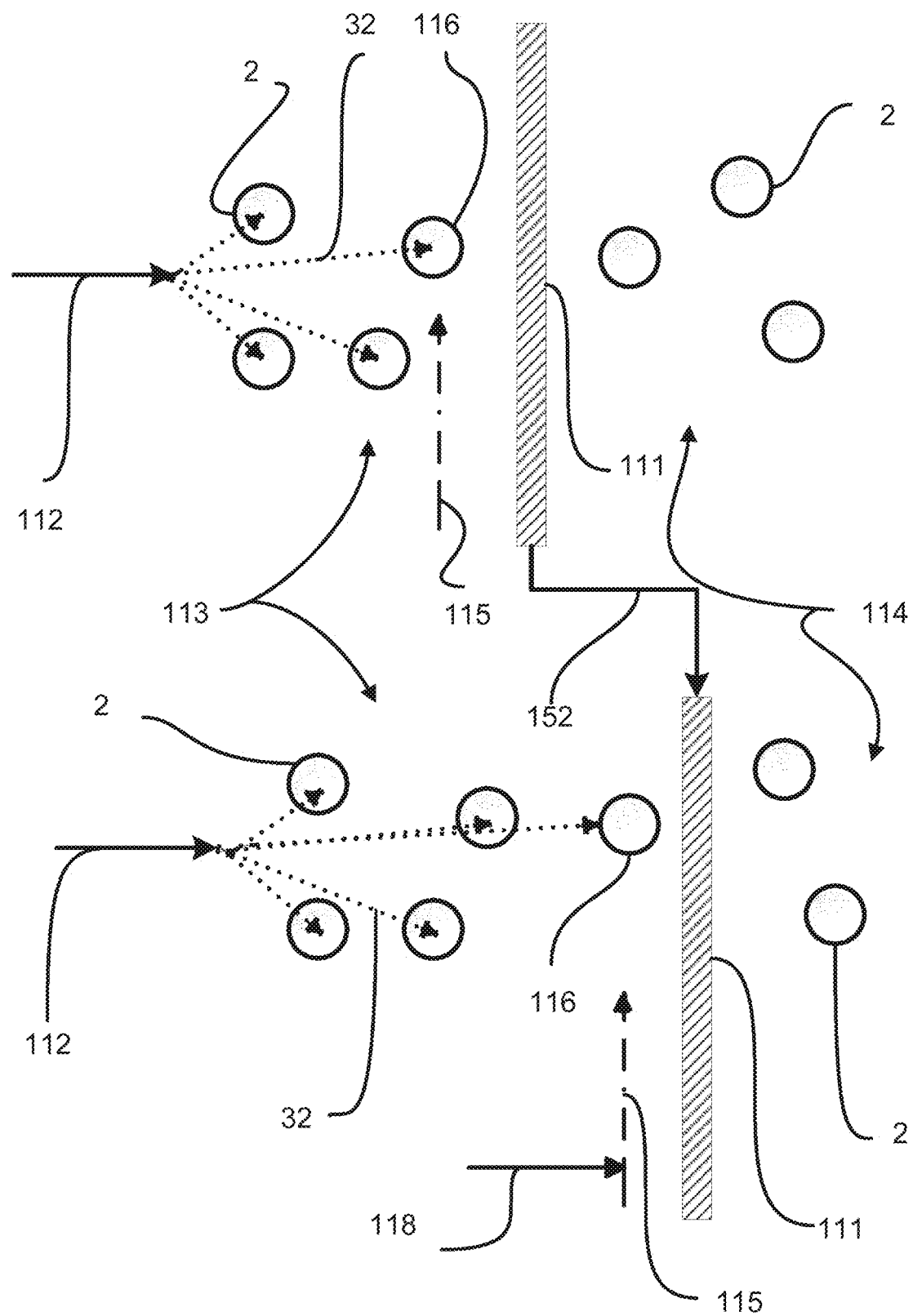
FIG. 3 illustrates division of considered measurements and unconsidered measurements.

FIG. 3 illustrates division of measurement 111 between considered measurements 113 and unconsidered measurements 114. For each passive track 112 associations 32 have been calculated between a passive track 112 and each considered measurements 113. The remaining of the measurements 2 are unconsidered 114 with respect to the passive track 112.

In this embodiment division 111 of considered measurements 113 and unconsidered measurements 114 is performed by using an ordered identifier 115 of incoming measurements 2 and storing the ordered identifier 115 of the latest considered measurement 116 on each passive track 112.

This is understood in relation to FIG. 2 wherein the track propagator 150 is configured to propagate 152 a selected passive track 117 according to the ordered identifier 115 and advancing 118 the ordered identifier 115 of the latest considered measurement 116 of the selected passive track 117.

Figure 4:
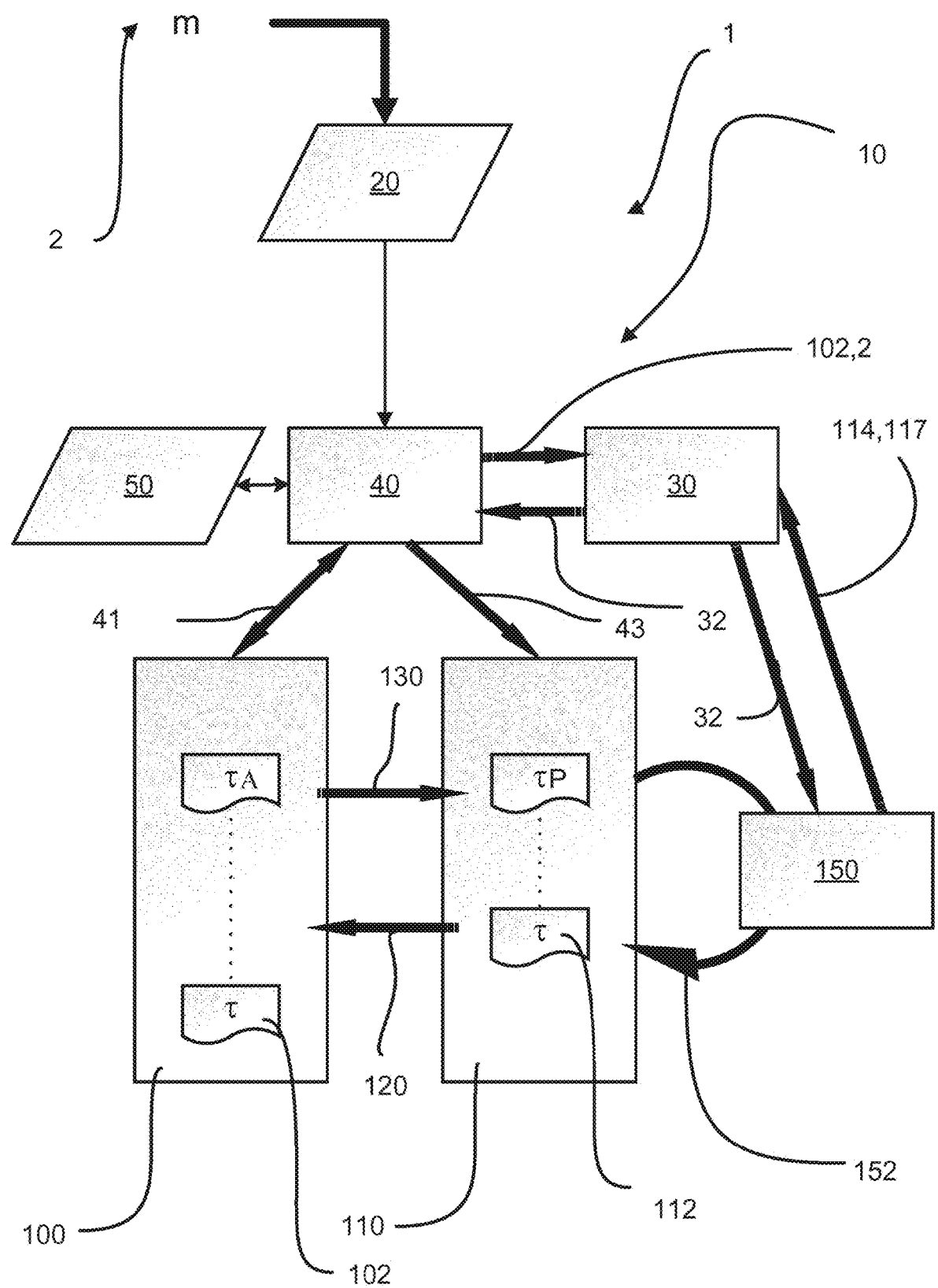
FIG. 4 illustrates an embodiment of a tracking device with a propagator and receiving module.

FIG. 4 illustrates in continuation of the previous figures a tracking device 1 further configured with a receiving module 20.

The receiving module 20 may be configured to prepare measurements 20 for processing. The receiving module 20 may further be configured to assign a receiving time 22 (not shown) or generate an ordered identifier 115 (not shown).

Furthermore the tracking devices 1 illustrated may be configured with a storage 23 (not shown), and a measurement container 70 (not shown). Finally, the tracking device may trivially be configured to eliminate obsolete data records using a pruning module 90 (not shown) or equivalent.

The shown tracking devices 1 may be obtained by implementing the outlined functionalities in a different order or configuration.

In this embodiment, the propagation module 150 commands the association module 30 to calculate an association 32 between the selected passive track 117 τ and an unconsidered measurement 114 such that this measurement becomes considered 113 (not shown).

The association 32 might contain a track update 5, τ'=τ∪{m}, which is inserted into the set of passive tracks 100. For all considered measurements 117 the original τ is also considered for new track τ'.

Figure 5:
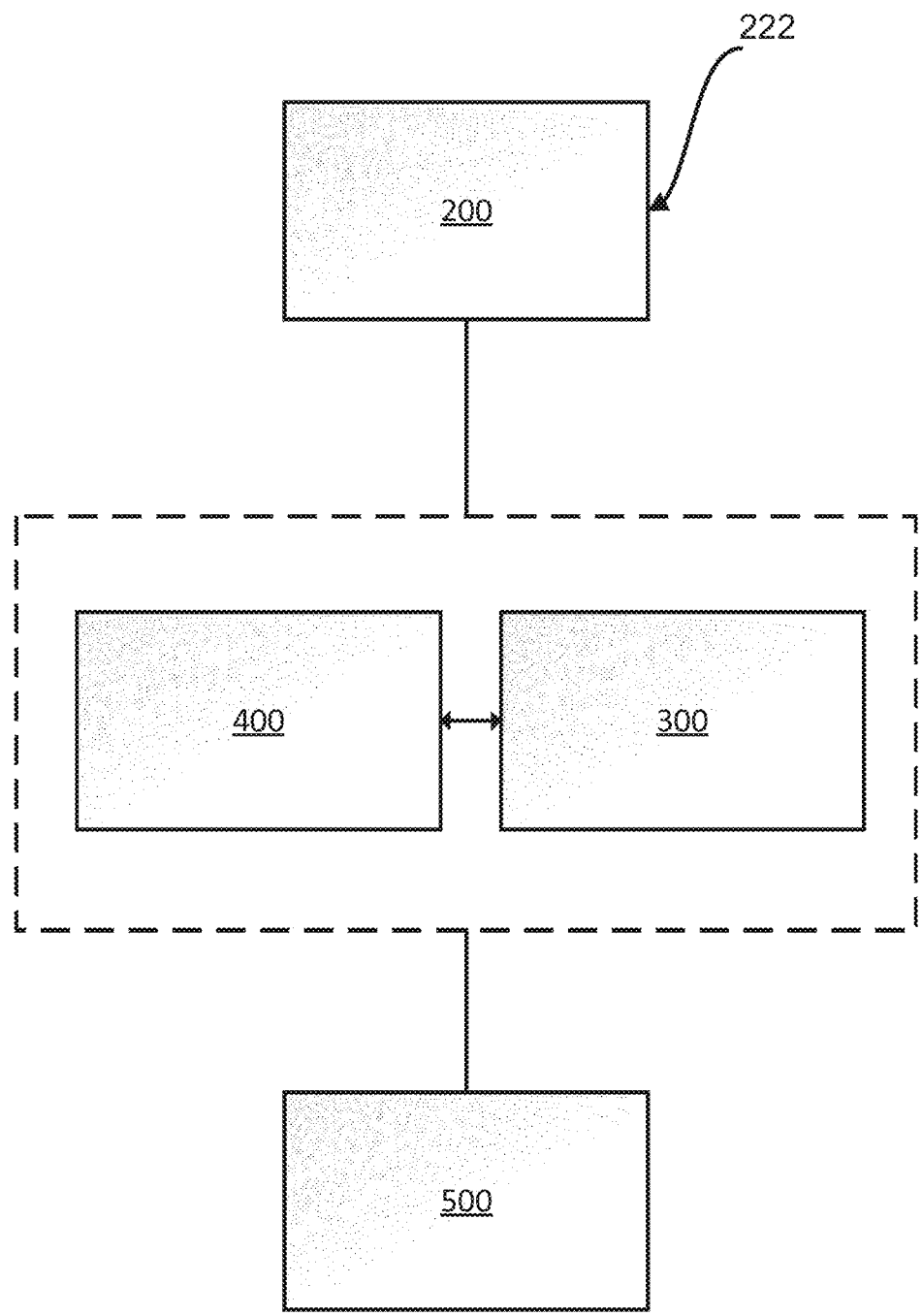
FIG. 5 illustrates a method of tracking.

FIG. 5 illustrates a method of tracking 222. Features from the previous figures are implemented or programmed based on the steps and descriptions disclosed herein.

The method comprises receiving a measurement 2 (not shown), which may be from a sensor 8 (not shown) and to process a measurement 2 and a track 4 (not shown).

The method of tracking 222 encompasses receiving 200 a measurement 2. The method of tracking encompasses associating 300 a measurement 2 with a track 4 by calculating an association 32 (not shown) between a measurement 2 and a track 4.

The method of tracking 222 includes assigning 400 tracks 4 by maintaining 41 (not shown) a set of active tracks 100 (not shown) by associating 300 and extracting possible track updates 5 (not shown) and deciding which track updates 5 to keep 42 (not shown) in the set of active tracks 100 and which track updates 5 to add 43 (not shown) to a set of passive tracks 110 (not shown) and further encompassing functionality to activate 120 (not shown) a passive track 112 (not shown) from the set of passive tracks 110 and activate 120 (not shown) the passive track 112 from the set of passive tracks 110 to the set of active tracks 100.

Assigning 400 and associating 300 are interrelated in the same way as the assignment module 40 and association module 30 illustrated in FIG. 1.

The method of tracking 222 encompasses outputting 500 a track update 5.

Figure 6:
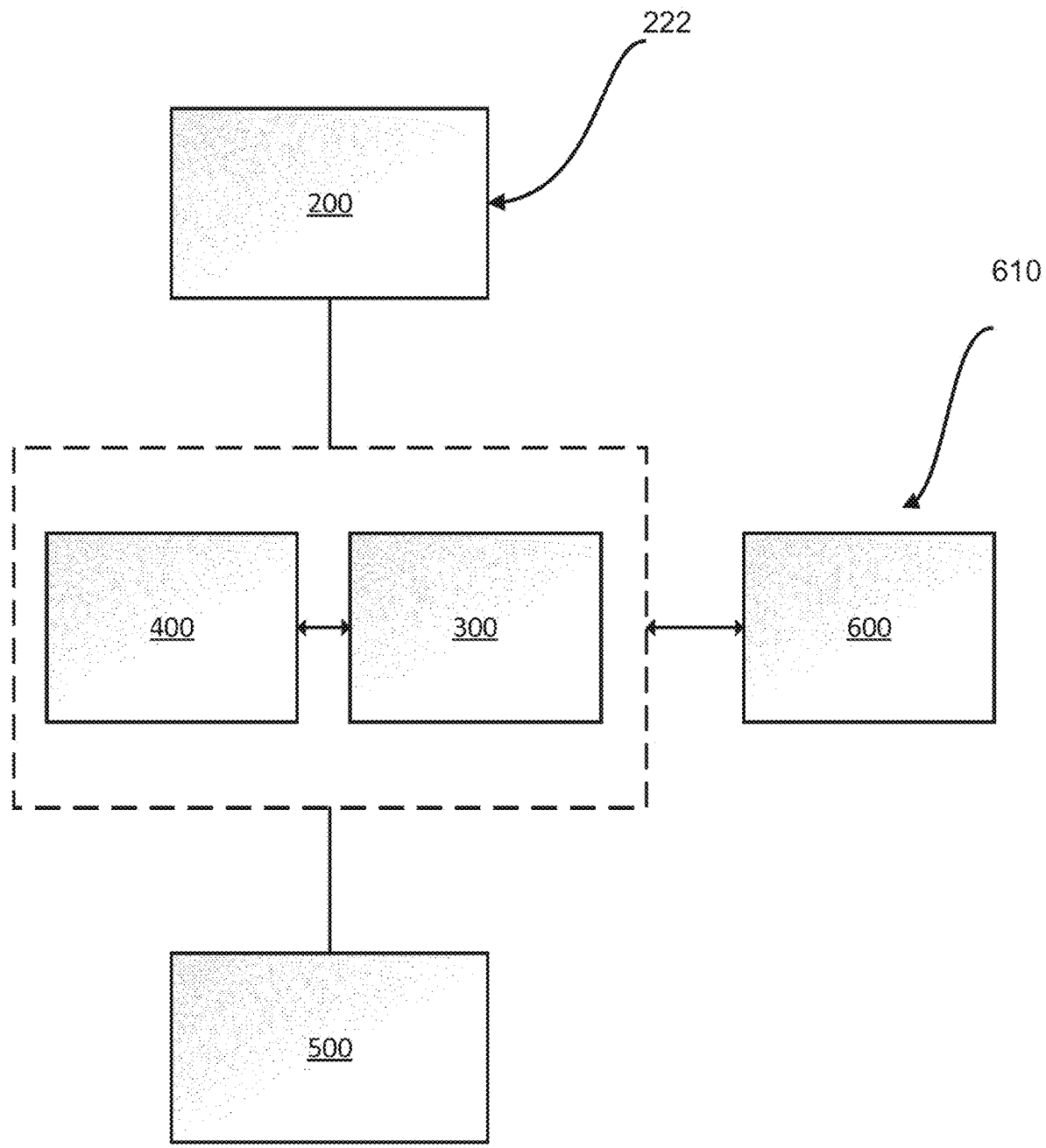
FIG. 6 illustrates a method of tracking including propagating.

FIG. 6 illustrates in continuation of FIG. 5 a method of tracking 222. Again reference is made to disclosures herein or previous figures. In particular reference is made to features described in FIG. 2.

The method of tracking 222 includes dividing 610 all measurements 2 (not shown) into a set of considered measurements 113 (not shown) and a set of unconsidered measurements 114 (not shown) for each passive track 112 (not shown).

The method of tracking 222 includes propagating 600 a selected passive track 117 (not shown) by associating 300 by calculating an association 32 (not shown) as a function of an unconsidered measurement 114 and the selected passive track 117 and adding the possible track update 5 (not shown) of the selected passive track 117 and the unconsidered measurement 114 to the set of passive tracks 110, marking the measurement considered 113 for both the selected passive track 117 and the possible track update 5.

For both embodiments of FIGS. 5 and 6 details about assigning 400 can be found in the description or summary regarding the assignment module 40. Likewise, details about associating 300 can be found in the description or summary regarding the association module 30.

Figure 7:
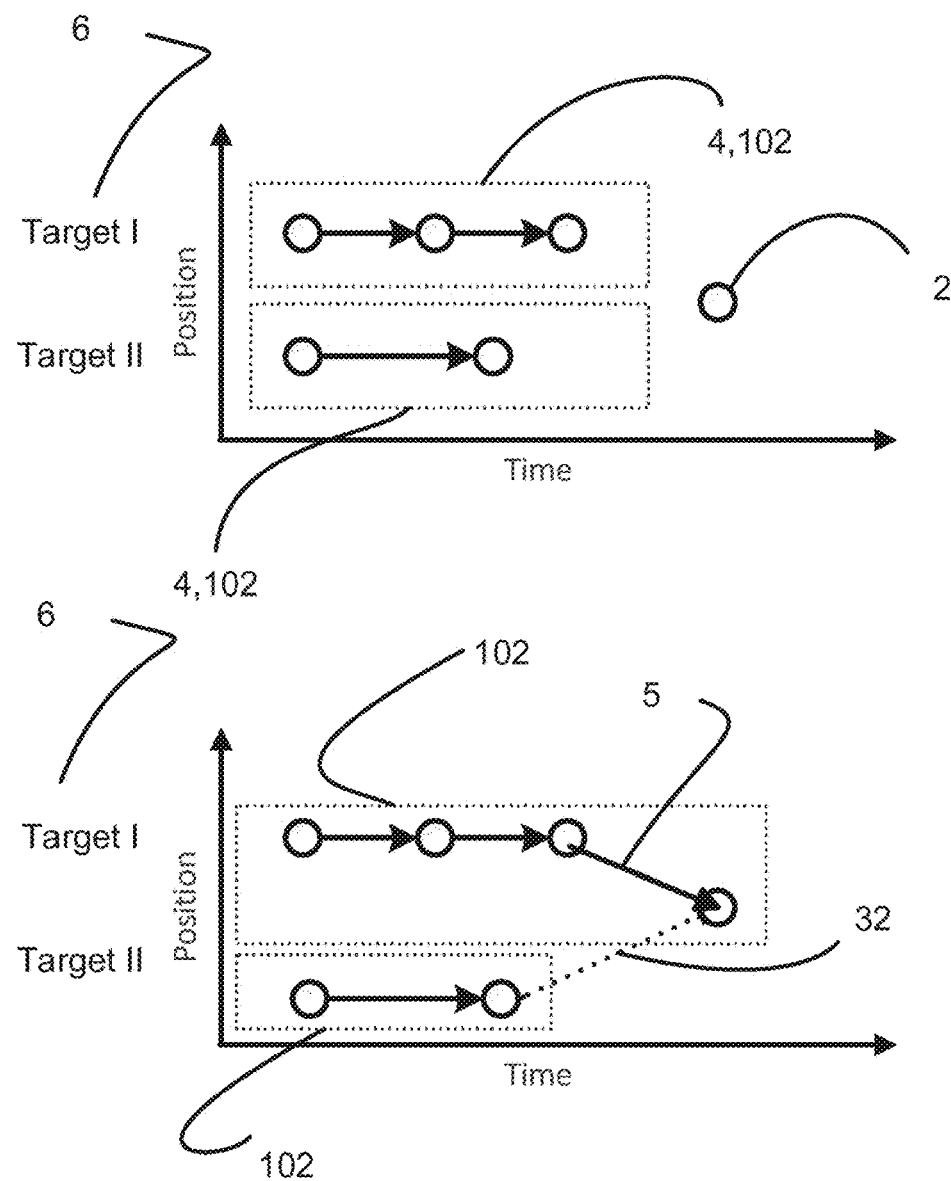
FIG. 7 illustrates definitions of targets, measurements, and tracks and track updates.

FIG. 7 illustrates track updates 5 of measurements 2 using an assignment module based on a 2-D assignment. In this example two targets 6, target I and target II, are tracked. Because 2-D assignment cannot have multiple hypotheses there can only be one track 4 per target 6.

In the top figure two active tracks 102 and a single new incoming measurement 2 are shown.

In the bottom figure, two associations 32 between the two active tracks 102 and the incoming measurement 2 are shown. The upper has the highest associability 31 (not shown) and that track 4 is kept 42 (not shown). or remains, in the set of active tracks 100 (not shown).

Figure 8:
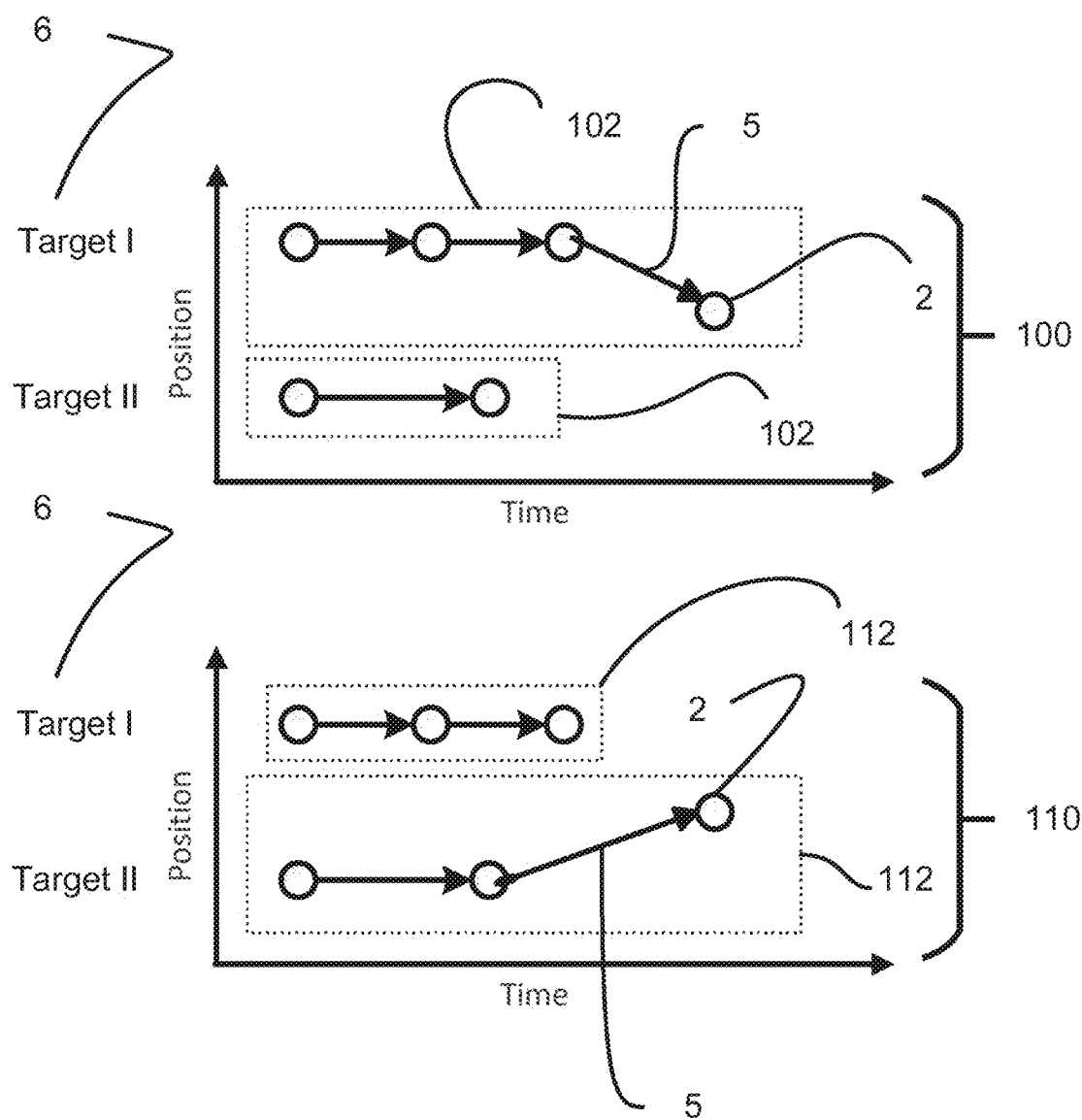
FIG. 8 illustrates definitions of targets, measurements, and tracks of active and passive sets of measurements.

FIG. 8 illustrates in the top part in continuation of FIG. 7 two active tracks 102 as the currently most likely representation of target I and target II, respectively.

In the top part, the set of active tracks 100 consists of two active tracks 102—one for each target 6—after processing the single incoming measurement 2 is shown.

In the bottom part, the set of passive tracks 110 is updated as a track update 5 with the shown passive tracks 112. The update is performed by the assignment module 40 (not shown) in the tracking device 1 (not shown) or by assigning 400 (not shown) in the method of tracking 222 (not shown).

The FIGS. 9 to 15 describe a process of an embodiment in an implementation using a 2-D assignment implementation in the assignment module 40 (not shown) exemplified with measurements originating from a scan-based radar sensor with a fixed scan period.

Each figure illustrates the situation with the logarithm of the track likelihood 25 (Log L) versus time (or radar period) plot (top) and the same situation in a position versus time plot (bottom). All figures illustrate the same features, which features are illustrated in FIG. 9 (active tracks 102) and FIG. 10 (passive track 112) and remain self-explanatory here from.

Figure 9:
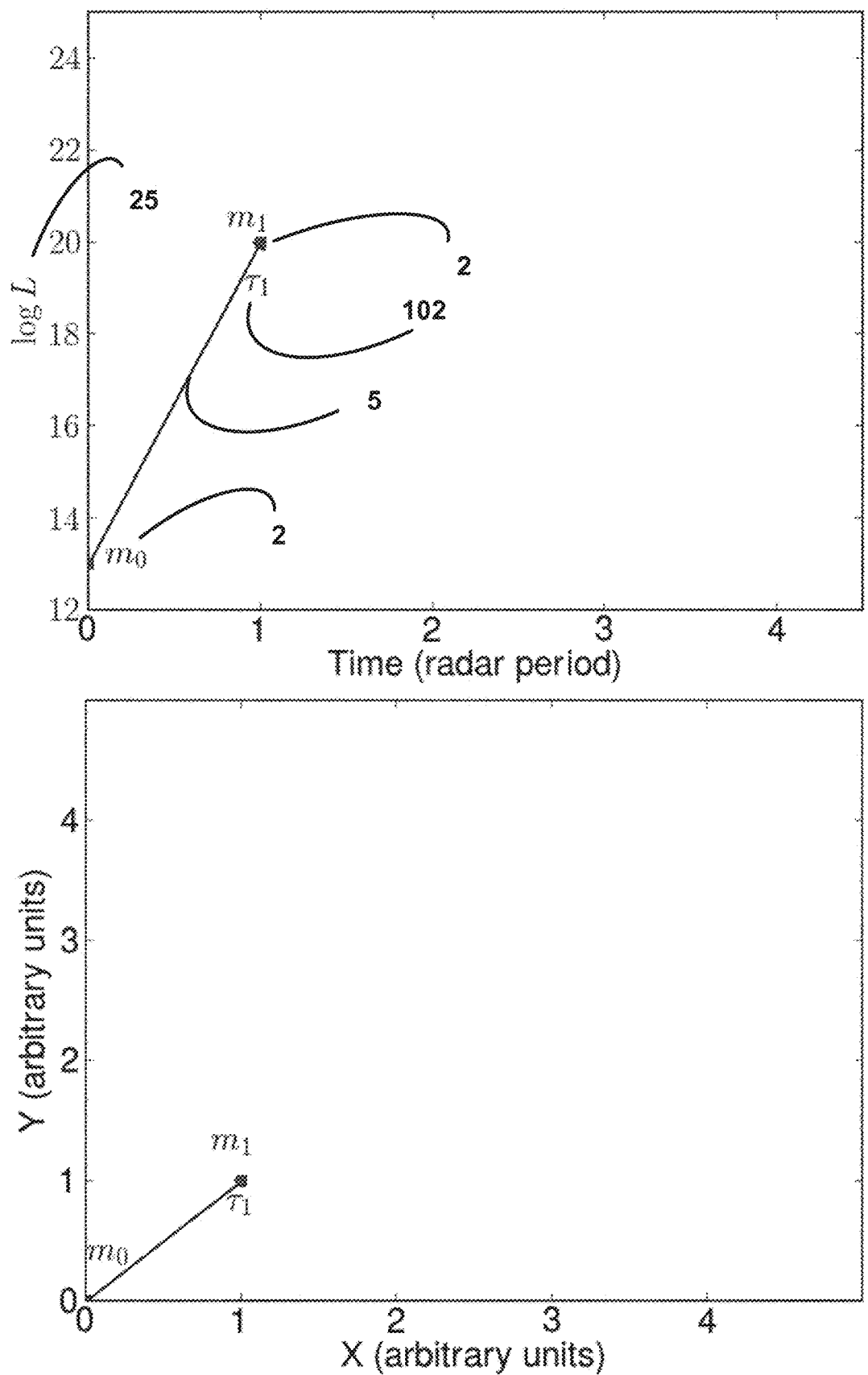
FIG. 9 to 15 illustrates a temporal evolution of tracking.

FIG. 9 illustrates the initial tracking with one target 6 and one track 4, $\tau_1 = \{\ldots m_0, m_1\}$. Thus, the set of active tracks 100 is one active track 102, $\tau_1$.

Figure 10:
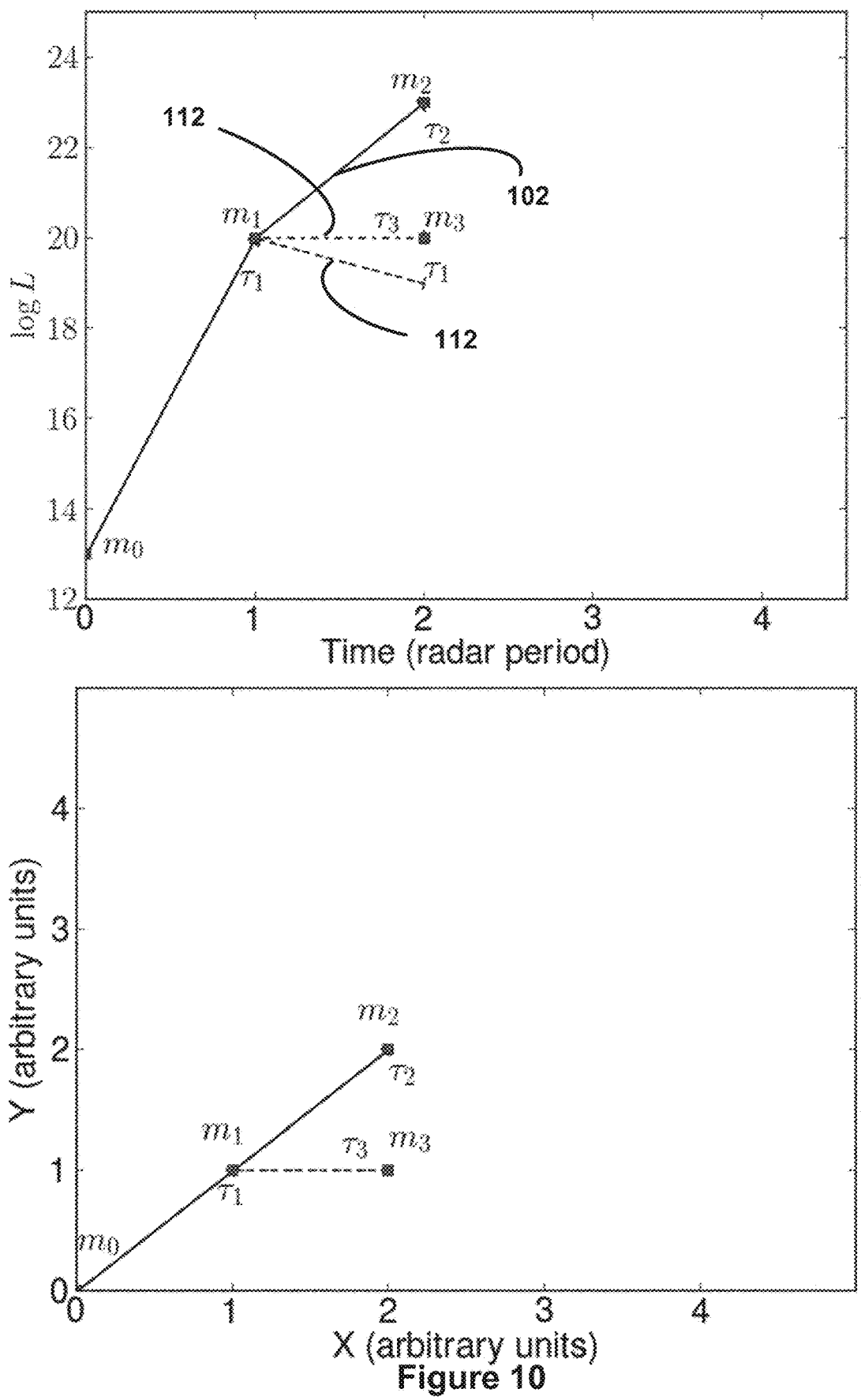

In FIG. 10 there are two incoming measurements 2, $m_2$ and $m_3$. The association module 30 is used to calculate associations 32 (not shown) and two track updates 5, $\tau_2 = \tau_1 \cup \{m_2\} = \{\ldots m_0, m_1, m_2\}$ and $\tau_3 = \tau_1 \cup \{m_3\} = \{\ldots m_0, m_1, m_3\}$. Since $\tau_1$ has a probability of detection $P_D(\tau_1)$, the track likelihood 25 $L(\tau_1)$ is multiplied with a factor of $(1-P_D(\tau_1))$ as it has not been updated.

The assignment module 40 (not shown) or the step of assigning 400 (not shown) then considers tracks 4, $\tau_1$, $\tau_2$ and $\tau_3$, and keeps $\tau_2$ since it has the highest associability 31, here calculated as the log $L(\tau_2)$–log $L(\tau_1)$, where $L(\tau_1)$ is the likelihood 25 of a track 4 $\tau$. Thus the set of active tracks 100 (not shown) contains one active track (102), $\tau_2$. $\tau_1$ and $\tau_3$ are added 43 (not shown) to the set of passive tracks 110 (not shown) as passive tracks 112.

Figure 11:
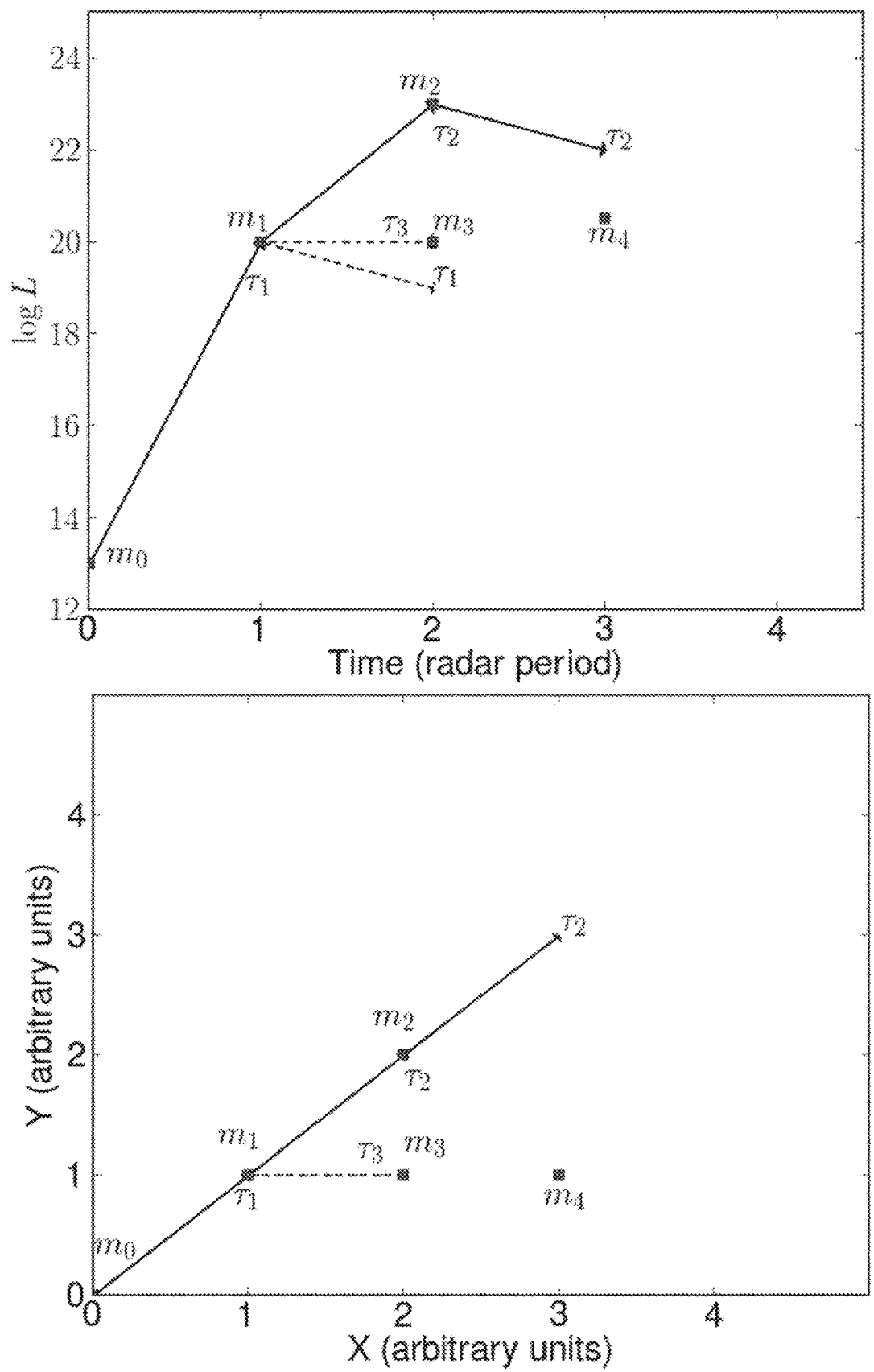

Continuing from FIGS. 9 and 10, in FIG. 11 one incoming measurement 2, $m_4$, is received or obtained. The association module 30 is used to calculated the association 32 between the single active track 102, $\tau_2$, and $m_4$. The associability 31 is too small because the distance between the expected position of $\tau_2$ and $m_4$ is too large, therefore there is no track update 5 between $\tau_2$ and $m_4$. Therefore the track likelihood 25 $L(\tau_2)$ is multiplied with a factor of $(1-P_D(\tau_2))$ leading to a decreased log $L(\tau_2)$. At this point the probability estimate of $\tau_3$ is still too low given the computational resources for $\tau_3$ to be selected for propagation 600.

Figure 12:
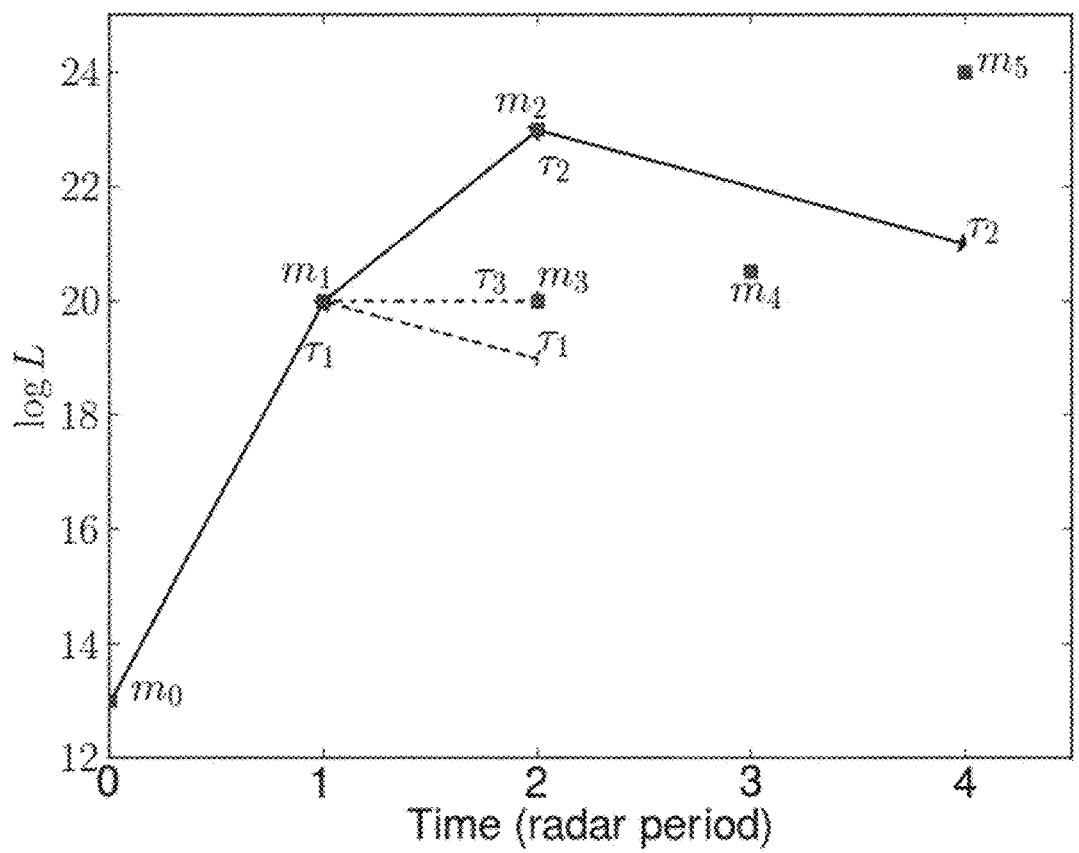
Figure 12:
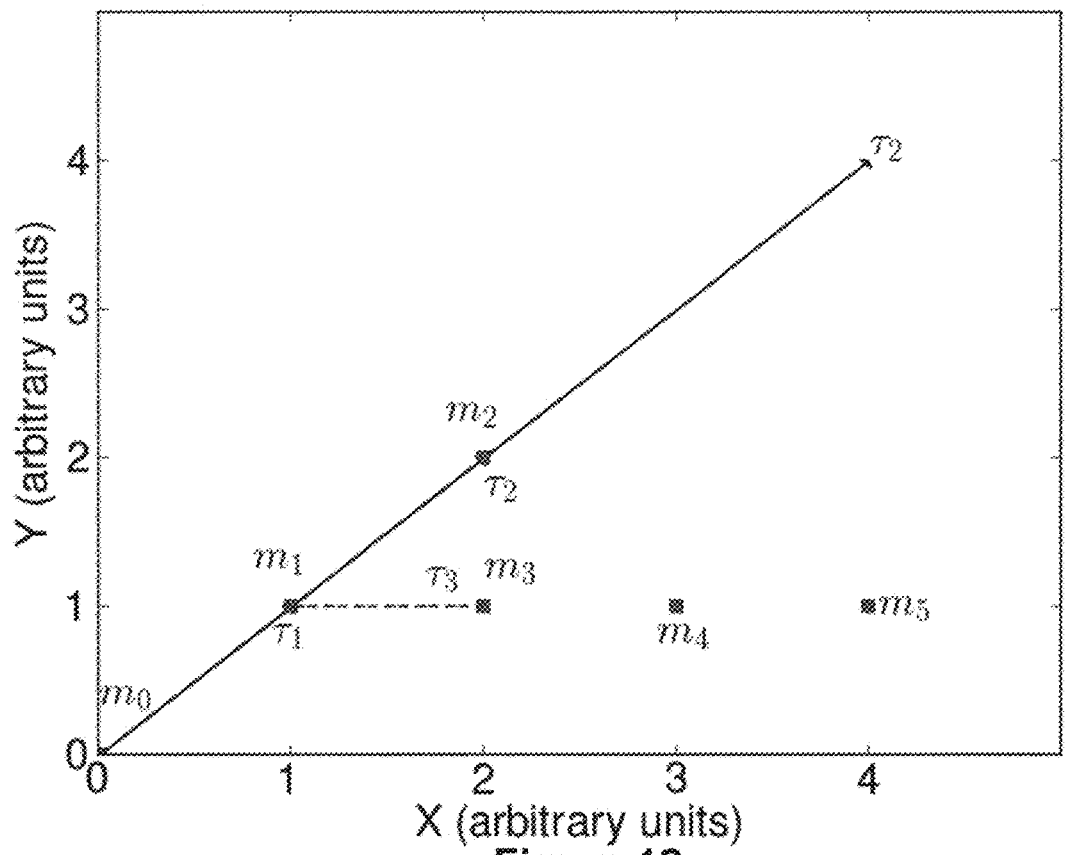

In FIG. 12 one incoming measurement 2, $m_5$, is received. The association module 30 calculates the association 32 between the single active track 102, $\tau_2$, and $m_5$. The associability 31 is too small because the distance between the expected position of $\tau_2$ and $m_5$ is too large, therefore there is no track update 5 between $\tau_2$ and $m_4$. Therefore, the track likelihood 25 $L(\tau_2)$ is multiplied with a factor of $(1-P_D(\tau_2))$ At this point the estimate of track probability 26 of $\tau_3$ has grown due to decrease in $L(\tau_2)$, and therefore there is now computational resources available for the passive track 112 $\tau_3$ to be selected 117 for propagation 600.

Figure 13:
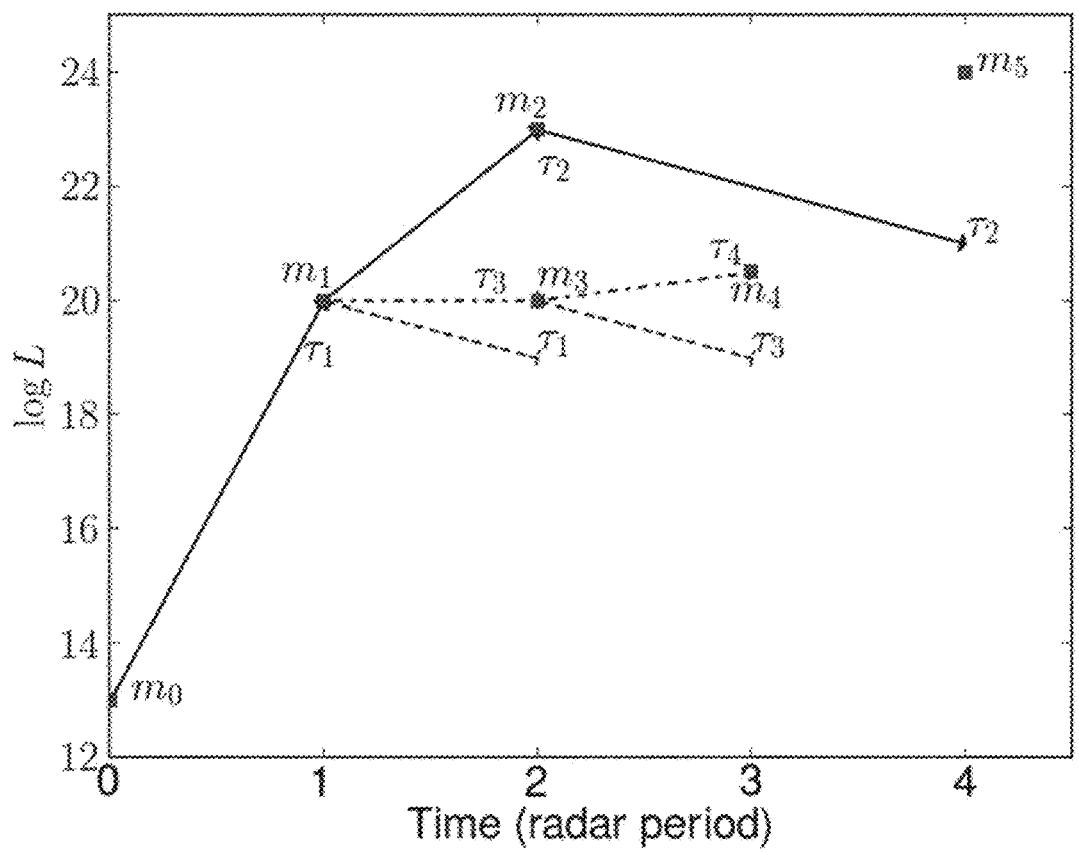
Figure 13:
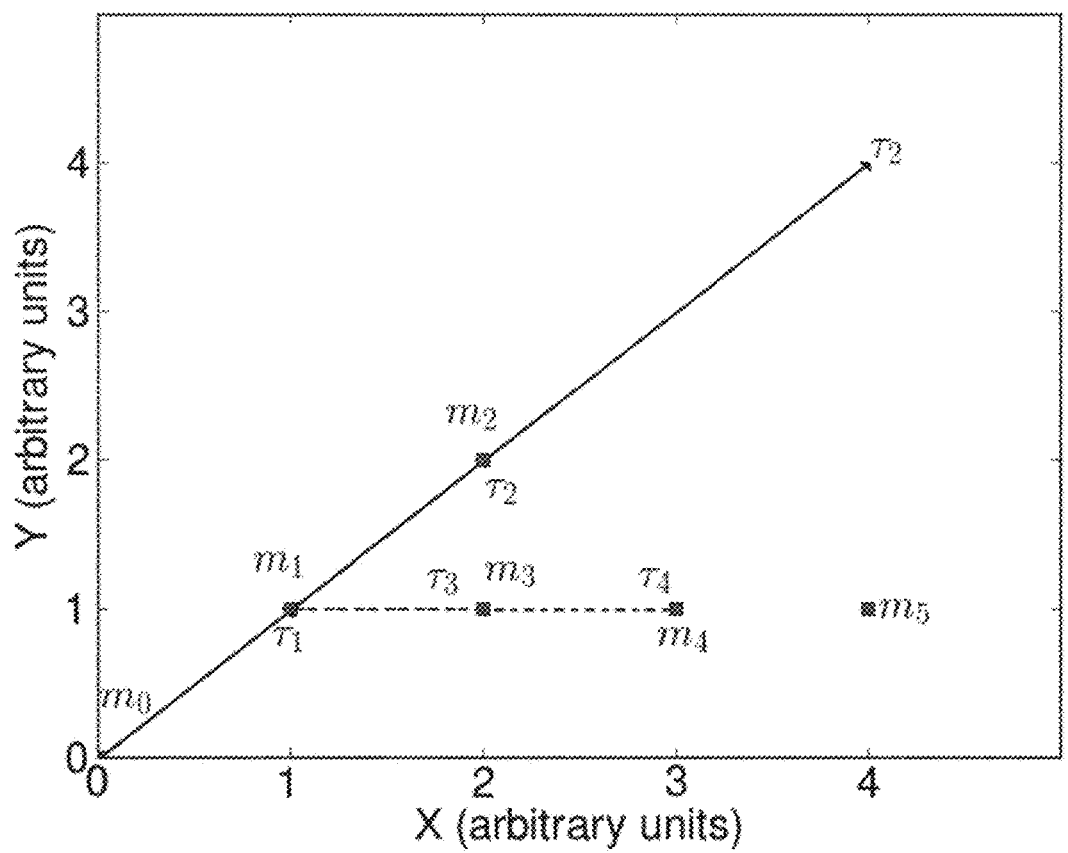

In FIG. 13 the passive track 112, $\tau_3$, is propagated 152 by the propagation module 150. The association module 30 calculates the association 32 between $\tau_3$ and the unconsidered measurement 114, $m_4$. The associability 31 is large enough to generate a track update 5, $\tau_4 = \tau_3 \cup \{m_4\} = \{\ldots m_0, m_1, m_3, m_4\}$. Again the likelihood $L(\tau_3)$ is lowered by a factor $(1-P_D(\tau_3))$ because track 4 $\tau_3$ is not updated with a measurement 2.

As this stage both the track likelihood 25 and estimate of track probability 26 of track 4 $\tau_2$ exceed the track likelihood 25 and estimate of track probability 26 of track 4 $\tau_4$.

Figure 14:
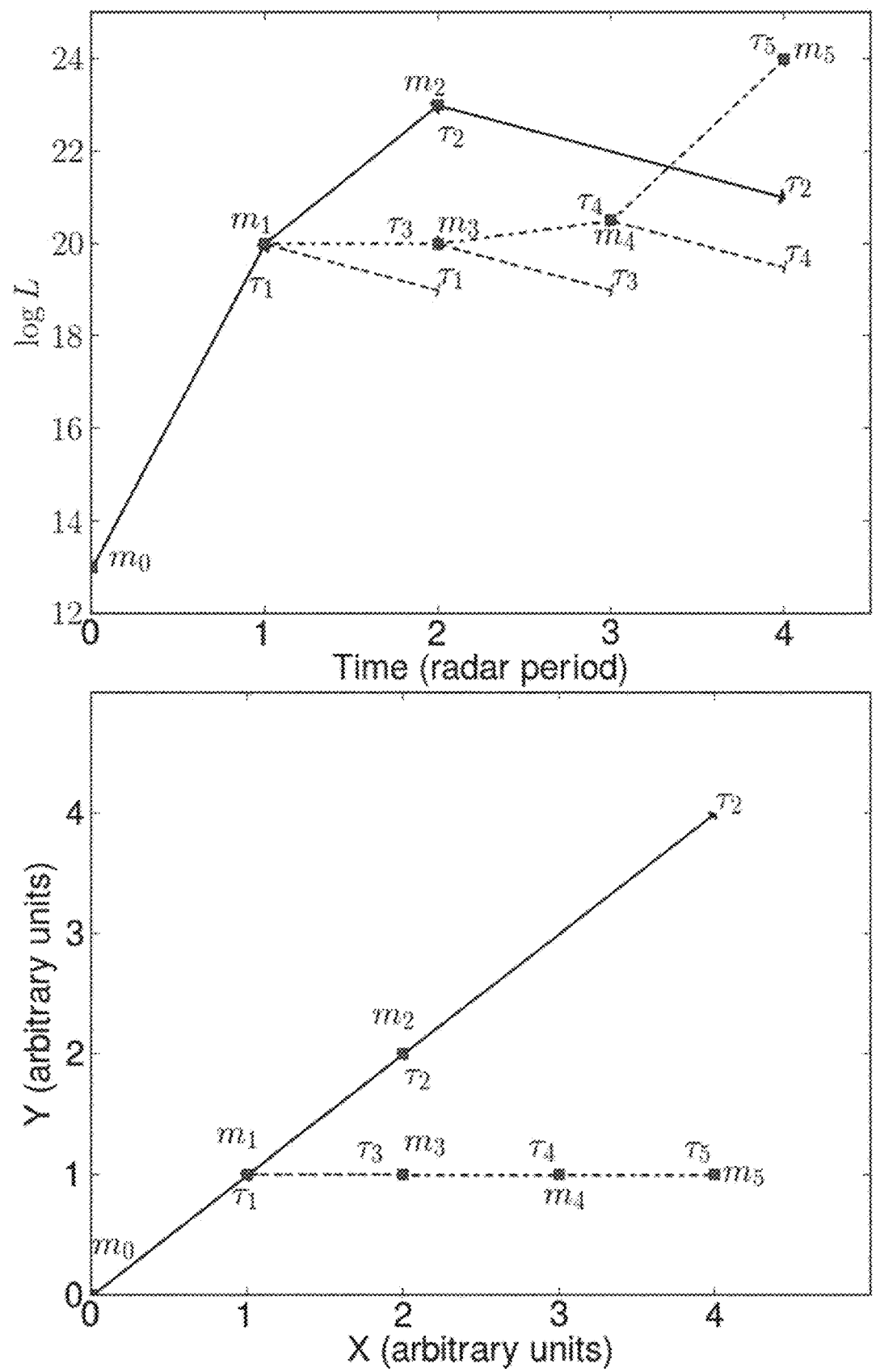

In FIG. 14 the passive track 112, $\tau_4$, is propagated 152 by the propagation module 150. The association module 30 is used to calculate the association 32 between $\tau_4$ and the unconsidered measurement 114 $m_5$. The associability 31 is large enough to generate a track update 5, $\tau_5 = \tau_4 \cup \{m_5\} = \{\ldots m_0, m_1, m_3, m_4, m_5\}$. Again the likelihood $L(\tau_4)$ is lowered by a factor $(1-P_D(\tau_4))$ because track 4 $\tau_3$ is not updated with a measurement 2.

Now both the track likelihood 25 and the estimate of track probability 26 of track 4 $\tau_2$ are lower than the track likelihood 25 and estimate of track probability 26 of track 4 $\tau_5$.

Figure 15:
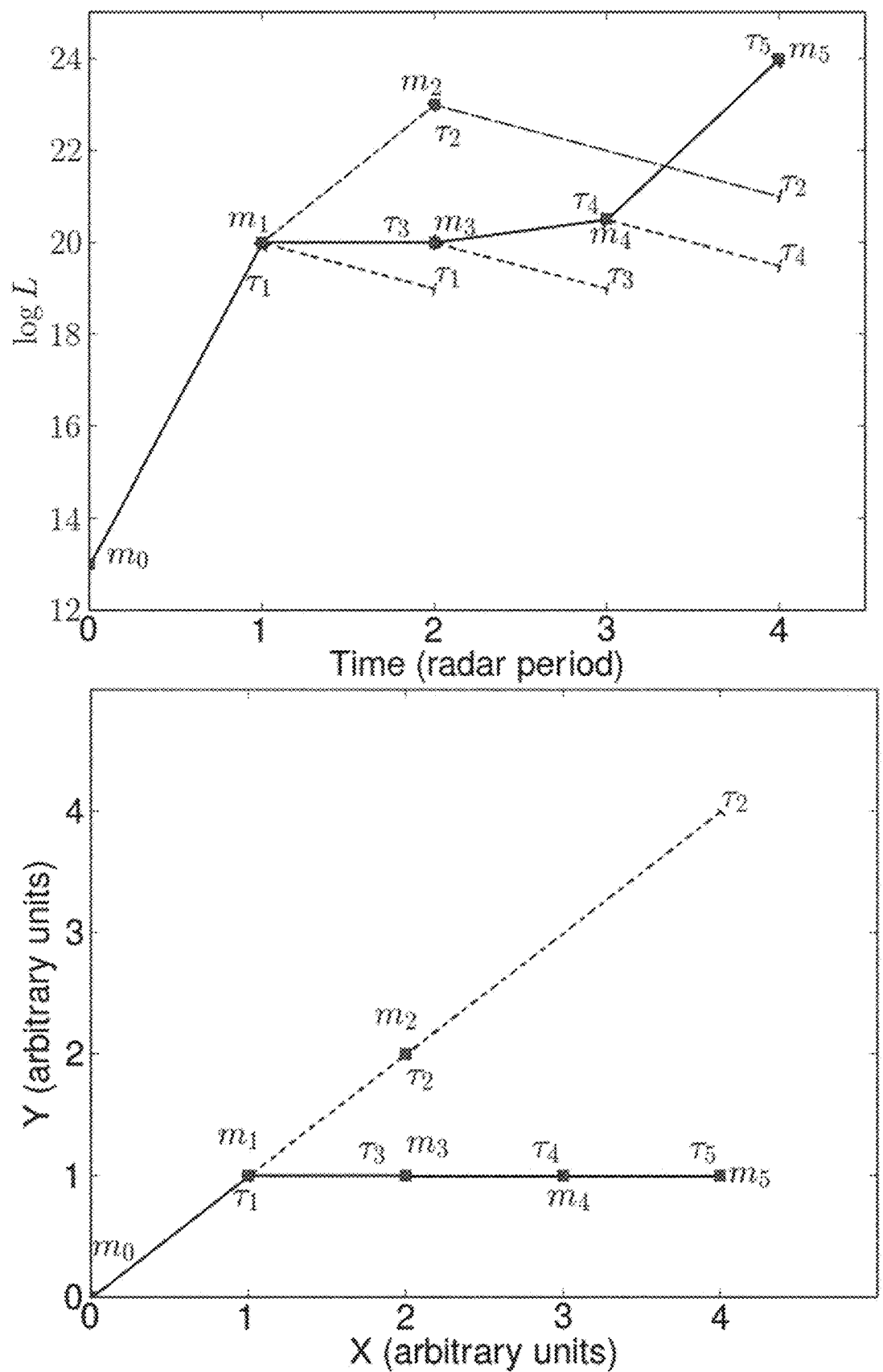

Therefore and importantly as seen in FIG. 15, the passive track 112 $\tau_5$ is activated 120 and moved from the set of passive tracks 110 to the set of active tracks 100.

Because $\tau_2$ and $\tau_5$ are conflicting tracks 27 (not shown), and 2-D assignment only can handle non-conflicting tracks 28 (not shown) In the set of active tracks 100, track 4 $\tau_2$ is passivated 130 and moved to the set of passive tracks 110.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A tracking device configured to estimate a track for at least one possible target and configured to receive incoming measurements and to process measurements and tracks, said tracking device comprising:
   a storage and a computational device having a computational capacity and configured with:
      an association module configured to calculate an association between a measurement and a track;
      an output module configured to output a sequence of track updates from an assignment module;
      an assignment module configured to maintain a set of active tracks and, using the association module to calculate associations between active tracks and the incoming measurements, the calculated associations containing possible track updates, deciding which track updates to keep in the set of active tracks and which track updates to add to a set of passive tracks, the set of passive tracks comprises tracks which are not updated when new measurements are received at the tracker;
   the computational device being configured to:
      defer computations on the set of passive tracks until at least one passive track handling criterion is fulfilled,
      activate at least one passive track from the set of passive tracks and transfer the at least one passive track from the set of passive tracks to the set of active tracks by at least one of the computations,
   the tracking device further configured to divide all measurements into a set of considered measurements and a set of unconsidered set of measurements for each passive track; and comprising:
      a propagator module configured to propagate by the computations on the set of passive tracks, a selected passive track using the association module to calculate an association as a function of an unconsidered measurement and the selected passive track; adding the possible track update of the selected passive track and the unconsidered measurement to the set of passive tracks, and marking the measurement considered for both the selected passive track and the possible track update.

2. The tracking device according to claim 1, wherein the passive track handling criterion is a function of available computational capacity and/or a function of track probability or track likelihood.

3. The tracking device according to claim 1, wherein computations on the set of passive tracks are deferred or postponed for up to 25 frames.

4. The tracking device according to claim 1, wherein a division of considered measurements and unconsidered measurements is performed by using an ordered identifier of incoming measurements and storing the ordered identifier of the latest considered measurement on each passive track, and wherein the track propagator is-configured to propagate a selected passive track according to the ordered identifier, advancing the ordered identifier of the latest considered measurement of the selected passive track.

5. The tracking device according to claim 1, configured to propagate passive tracks as a function of available computational capacity.

6. The tracking device according to claim 1, configured to activate passive tracks as a function of available computational capacity.

7. The tracking device according to claim 1, configured to passivate an active track and transfer the active track from the set of active tracks to the set of passive tracks.

8. The tracking device according to claim 1, configured to prioritize the computations on the set of passive tracks based on a function of track likelihood or track probability.

9. The tracking device according to claim 1, configured to prioritize propagation of passive tracks based on a function of track likelihood, $L(\tau)$.

10. The tracking device according to claim 1, configured to prioritize propagation of passive tracks based on a function of an estimate of track probability, $P(\tau)$.

11. The tracking device according to claim 1, wherein the assignment module is based on one or more of the following assignments algorithms:
    A. a Nearest Neighbor algorithm;
    B. a 2-dimensional assignment algorithm;
    C. an N-dimensional assignment algorithm;
    D. a K-best multi hypothesis assignment; or
    E. a K-best N-dimensional assignment.

12. The tracking device according to claim 11, selections A or B, wherein activating tracks is performed by estimating the best hypothesis considering the set of active tracks and a subset of the set of passive tracks, and activating tracks belonging to the hypothesis and passivating tracks not belonging to the hypothesis.

13. The tracking device according claim 1, wherein the best hypothesis among a set of tracks is estimated by repeatedly:
    selecting the track with the highest estimate of track probability, $P(\tau)$
    disregarding all conflicting tracks.

14. The tracking device according to claim 10, wherein the estimate of track probability $P(\tau)$ is estimated as:

$$P(\tau) \simeq P_0(\tau) \equiv \frac{L(\tau)}{L_0 + \sum_{\tau' \in t} L(\tau')}$$

where t is the target for which $\tau$ is an possible track.

15. The tracking device according to claim 10, wherein the estimate of track probability, $P(\tau)$ is estimated by an approximation:

$$P(\tau) \approx P_{\mathit{eff}}(\tau) \equiv \frac{L(\tau)X(\tau)}{L_0 + \sum_{\tau' \in t} L(\tau')X(\tau')}$$

where:

$$X(\tau) \equiv \min_{\mathit{other\ targets}, t} X_t(\tau)$$

where:

$$X_t(\tau) \equiv 1 - \sum_{\tau' \in t, \tau \cap \tau' \neq \emptyset} P_0(\tau')$$

where:

$$P_0(\tau) \equiv \frac{L(\tau)}{L_0 + \sum_{\tau' \in t} L(\tau')}$$

where t is the target for which $\tau$ is a possible track.

16. A method of tracking comprising processing a measurement and a track, said method of tracking comprising:
receiving a measurement;
associating a measurement with a track by calculating an association between a measurement and a track;
assigning tracks by maintaining a set of active tracks by associating and extracting possible track updates and deciding which track updates to keep in the set of active tracks and which track updates to add to a set of passive tracks, the set of passive tracks comprises tracks which are not updated when new measurements are received at the tracker;
defer computations on the set of passive tracks until at least one passive track handling criterion is fulfilled, wherein at least one of the computations on the set of passive tracks activate a passive track from the set of passive tracks and transfer the passive track from the set of passive tracks to the set of active tracks;
dividing all measurements into a set of considered measurements and a set of unconsidered set of measurements for each passive track;
propagating by the computations on the set of passive tracks, a selected passive track by calculating an association as a function of an unconsidered measurement and the selected passive track, adding the possible track update of the selected passive track and the unconsidered measurement to the set of passive tracks, and marking the measurement considered for both the selected passive track and the possible track update; and
outputting a track update.

17. The method of tracking according to claim 16, further comprising:
dividing all measurements into a set of considered measurements and a set of unconsidered measurements for each passive track; and
propagating a selected passive track by associating by calculating an association as a function of an unconsidered measurement and the selected passive track and adding the possible track update of the selected passive track and the unconsidered measurement to the set of passive tracks, marking the measurement considered for both the selected passive track and the possible track update.

18. The method of tracking according to claim 16, wherein propagating of passive tracks is based on a function of track likelihood, $L(\tau)$, or on a function of an estimate of track probability, $P(\tau)$.

19. The method of tracking according to claim 16, wherein assigning is based on one or more of the following assignments algorithms:
A. a Nearest Neighbor algorithm;
B. a 2-dimensional assignment algorithm;
C. an N-dimensional assignment algorithm;
D. a K-best multi hypothesis assignment; or
E. a K-best N-dimensional assignment.

20. The method of tracking according to claim 18, wherein propagating is based on an estimate of track probability $P(\tau)$ estimated as:

$$P(\tau) \simeq P_0(\tau) \equiv \frac{L(\tau)}{L_0 + \sum_{\tau' \in t} L(\tau')}$$

where t is the target for which $\tau$ is an possible track; or estimated by an approximation:

$$P(\tau) \approx P_{\mathit{eff}}(\tau) \equiv \frac{L(\tau)X(\tau)}{L_0 + \sum_{\tau' \in t} L(\tau')X(\tau')}$$

where:

$$X(\tau) \equiv \min_{\mathit{other\ targets}, t} X_t(\tau)$$

where:

$$X_t(\tau) \equiv 1 - \sum_{\tau' \in t, \tau \cap \tau' \neq \emptyset} P_0(\tau').$$

where:

$$P_0(\tau) \equiv \frac{L(\tau)}{L_0 + \sum_{\tau' \in t} L(\tau')}$$

where t is the target for which $\tau$ is a possible track.

* * * * *